(12) United States Patent
Cherukuri et al.

(10) Patent No.: US 10,956,559 B2
(45) Date of Patent: *Mar. 23, 2021

(54) SYSTEMS, METHODS, AND APPARATUSES FOR CREDENTIAL HANDLING

(71) Applicant: Bomgar Corporation, Ridgeland, MS (US)

(72) Inventors: Rajesh Cherukuri, Madison, MS (US); John Burns Smith, III, Charlotte, NC (US); Nicholas Shawn Twerdochlib, Callahan, FL (US); Ricardo Fabiano De Andrade, Madison, MS (US)

(73) Assignee: BEYONDTRUST CORPORATION, Ridgeland, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/292,880

(22) Filed: Mar. 5, 2019

(65) Prior Publication Data

US 2019/0205524 A1 Jul. 4, 2019

Related U.S. Application Data

(63) Continuation of application No. 15/634,317, filed on Jun. 27, 2017, now Pat. No. 10,229,262, which is a continuation-in-part of application No. 15/133,641, filed on Apr. 20, 2016, now Pat. No. 10,397,233.

(60) Provisional application No. 62/355,083, filed on Jun. 27, 2016, provisional application No. 62/150,051, filed on Apr. 20, 2015.

(51) Int. Cl.
*H04L 9/00* (2006.01)
*G06F 21/45* (2013.01)
*H04L 29/06* (2006.01)
*H04W 12/06* (2021.01)
*H04L 9/08* (2006.01)
*H04L 29/08* (2006.01)

(52) U.S. Cl.
CPC .............. *G06F 21/45* (2013.01); *H04L 63/08* (2013.01); *H04L 63/0815* (2013.01); *H04L 63/102* (2013.01); *H04W 12/0608* (2019.01); *H04L 9/08* (2013.01); *H04L 63/0428* (2013.01); *H04L 67/02* (2013.01); *H04L 67/06* (2013.01)

(58) Field of Classification Search
USPC .......................................................... 726/4
See application file for complete search history.

(56) References Cited

U.S. PATENT DOCUMENTS 5,719,786 A 2/1998 Nelson
6,123,737 A 9/2000 Sadowsky
(Continued)

FOREIGN PATENT DOCUMENTS

WO 2005032892 A1 4/2005

*Primary Examiner* — Christopher J Brown
(74) *Attorney, Agent, or Firm* — Morris, Manning & Martin, LLP; Daniel E. Sineway; Adam J. Thompson

(57) ABSTRACT

An approach is described for securely and automatically handling credentials when used for accessing endpoints, and/or applications and resources on the endpoints, and more particularly accessing web endpoints and/or web applications and resources on the web endpoints. The approach involves selecting and injecting credentials at an endpoint by an accessor and/or protocol agent to log into the endpoint, running applications, or gaining access to resources on the endpoint, without full credential information traversing the accessor's machine.

28 Claims, 13 Drawing Sheets

(56) References Cited

U.S. PATENT DOCUMENTS

| | | |
|---|---|---|
| 6,327,579 B1 | 12/2001 | Crawford |
| 6,353,446 B1 | 3/2002 | Vaughn et al. |
| 6,466,654 B1 | 10/2002 | Cooper et al. |
| 7,117,529 B1 | 10/2006 | Odonnell |
| 7,240,102 B1 | 7/2007 | Kouznetsov et al. |
| 7,346,922 B2 | 3/2008 | Miliefsky |
| 7,373,553 B2 | 5/2008 | Trip et al. |
| 7,376,538 B1 | 5/2008 | Eatough |
| 7,539,627 B2 | 5/2009 | Schmidt |
| 7,539,733 B2 | 5/2009 | Mohammed et al. |
| 7,565,700 B2 | 7/2009 | Bellwood et al. |
| 7,587,588 B2 | 9/2009 | Clemmons et al. |
| 7,680,944 B1 | 3/2010 | Taghizadeh |
| 7,908,401 B2 | 3/2011 | Chang |
| 7,941,848 B2 | 5/2011 | Yadav et al. |
| 7,958,247 B2 | 6/2011 | Abu-Samaha |
| 8,024,399 B2 | 9/2011 | Reisman |
| 8,112,513 B2 | 2/2012 | Margulis |
| 8,156,205 B1 | 4/2012 | Forsberg |
| 8,166,310 B2 | 4/2012 | Harrison et al. |
| 8,321,540 B2 | 11/2012 | Webb-Johnson |
| 8,335,831 B2 | 12/2012 | Fan |
| 8,434,129 B2 | 4/2013 | Kannappan |
| 8,527,774 B2 | 9/2013 | Fallows |
| 8,850,516 B1 | 9/2014 | Hrebicek |
| 8,880,616 B2 | 11/2014 | Schuelke |
| 8,924,459 B2 | 12/2014 | Gagne et al. |
| 8,966,075 B1 | 2/2015 | Chickering et al. |
| 9,055,055 B1 * | 6/2015 | Strand ................ H04L 63/0815 |
| 9,178,773 B1 | 11/2015 | Tassone |
| 9,246,979 B2 | 1/2016 | Bomgaars |
| 9,305,182 B1 | 4/2016 | Berls |
| 9,712,514 B2 | 7/2017 | Brieman |
| 9,754,303 B1 | 9/2017 | Jagtap |
| 2001/0036176 A1 | 11/2001 | Girard |
| 2001/0051890 A1 | 12/2001 | Burgess |
| 2002/0075844 A1 | 6/2002 | Hagen |
| 2002/0091819 A1 | 7/2002 | Melchione |
| 2002/0120749 A1 | 8/2002 | Widegren et al. |
| 2002/0161895 A1 | 10/2002 | Appian et al. |
| 2002/0169783 A1 | 11/2002 | Kreulen et al. |
| 2003/0004791 A1 | 1/2003 | Kojima |
| 2003/0008265 A1 | 1/2003 | Helmick et al. |
| 2003/0009754 A1 | 1/2003 | Rowley |
| 2003/0018704 A1 | 1/2003 | Polychronidis |
| 2003/0023476 A1 | 1/2003 | Gainey |
| 2003/0033308 A1 | 2/2003 | Patel |
| 2003/0065731 A1 | 4/2003 | Mohammad |
| 2003/0065738 A1 | 4/2003 | Yang |
| 2003/0084010 A1 | 5/2003 | Bigus |
| 2003/0093530 A1 | 5/2003 | Syed |
| 2003/0093692 A1 | 5/2003 | Porras |
| 2003/0120135 A1 | 6/2003 | Gopinathan et al. |
| 2003/0120557 A1 | 6/2003 | Evans |
| 2003/0131084 A1 | 7/2003 | Pizzorni |
| 2003/0149740 A1 | 8/2003 | Wookey |
| 2003/0225905 A1 | 12/2003 | Scifres et al. |
| 2003/0233432 A1 | 12/2003 | Davis et al. |
| 2004/0001514 A1 | 1/2004 | Wookey et al. |
| 2004/0003073 A1 | 1/2004 | Krzyzanowski et al. |
| 2004/0153712 A1 | 8/2004 | Owhadi et al. |
| 2004/0173059 A1 | 9/2004 | Klein |
| 2004/0249975 A1 | 12/2004 | Tuck et al. |
| 2005/0038827 A1 | 2/2005 | Hooks |
| 2005/0050319 A1 | 3/2005 | Suraski |
| 2005/0080897 A1 | 4/2005 | Braun et al. |
| 2005/0132030 A1 | 6/2005 | Hopen |
| 2005/0177869 A1 | 8/2005 | Savage |
| 2005/0190769 A1 | 9/2005 | Smith |
| 2005/0234824 A1 | 10/2005 | Gill |
| 2005/0289226 A1 | 12/2005 | Mohammed et al. |
| 2006/0010485 A1 | 1/2006 | Gorman |
| 2006/0017551 A1 | 1/2006 | Neher |
| 2006/0031537 A1 | 2/2006 | Boutboul |
| 2006/0047927 A1 | 3/2006 | King et al. |
| 2006/0053447 A1 | 3/2006 | Krzyzanowski et al. |
| 2006/0064582 A1 | 3/2006 | Teal |
| 2006/0072721 A1 | 4/2006 | Wisniewski |
| 2006/0159243 A1 | 7/2006 | Mangione et al. |
| 2006/0248522 A1 | 11/2006 | Lakshminarayanan |
| 2006/0271968 A1 | 11/2006 | Zellner |
| 2006/0277287 A1 | 12/2006 | McCall et al. |
| 2007/0021138 A1 | 1/2007 | Allen et al. |
| 2007/0033265 A1 | 2/2007 | Anderson et al. |
| 2007/0044034 A1 | 2/2007 | Nieves |
| 2007/0047459 A1 | 3/2007 | Kadaba |
| 2007/0054686 A1 | 3/2007 | Allen |
| 2007/0067098 A1 | 3/2007 | Zelentsov |
| 2007/0130457 A1 | 6/2007 | Kamat et al. |
| 2007/0143824 A1 | 6/2007 | Shahbazi |
| 2007/0176787 A1 | 8/2007 | Iten et al. |
| 2007/0180501 A1 | 8/2007 | Yadav et al. |
| 2007/0218875 A1 | 9/2007 | Calhoun et al. |
| 2007/0239884 A1 | 10/2007 | Karmakar |
| 2007/0253418 A1 | 11/2007 | Shirt et al. |
| 2007/0255604 A1 | 11/2007 | Seelig |
| 2007/0260673 A1 | 11/2007 | Shenfiled |
| 2007/0268837 A1 | 11/2007 | Melton |
| 2007/0294368 A1 | 12/2007 | Bomgaars |
| 2007/0299953 A1 | 12/2007 | Walker |
| 2007/0300291 A1 | 12/2007 | Bomgaars |
| 2008/0010480 A1 | 1/2008 | Hurley et al. |
| 2008/0034060 A1 | 2/2008 | Fisher |
| 2008/0040441 A1 | 2/2008 | Maes |
| 2008/0065236 A1 | 3/2008 | Bristol |
| 2008/0091454 A1 | 4/2008 | Fisher |
| 2008/0172574 A1 | 7/2008 | Fisher |
| 2008/0184241 A1 | 7/2008 | Headrick et al. |
| 2008/0244705 A1 | 10/2008 | Cromer |
| 2009/0007217 A1 | 1/2009 | Birger |
| 2009/0019367 A1 | 1/2009 | Cavagnari |
| 2009/0052675 A1 | 2/2009 | Levow et al. |
| 2009/0077184 A1 | 3/2009 | Brewer et al. |
| 2009/0164554 A1 | 6/2009 | Wei |
| 2009/0187651 A1 | 7/2009 | Schuckenbrock et al. |
| 2009/0199276 A1 | 8/2009 | Schneider |
| 2009/0201303 A1 | 8/2009 | Westerhoff |
| 2009/0248794 A1 | 10/2009 | Helms |
| 2009/0271472 A1 | 10/2009 | Scheifler et al. |
| 2009/0299793 A1 | 12/2009 | Guzel |
| 2010/0071043 A1 | 3/2010 | Babula et al. |
| 2010/0138270 A1 | 6/2010 | Werth |
| 2010/0154009 A1 | 6/2010 | Del Sordo |
| 2010/0169497 A1 | 7/2010 | Klimentiev |
| 2010/0192020 A1 | 7/2010 | Van Riel |
| 2010/0192146 A1 | 7/2010 | Stay |
| 2010/0257596 A1 | 10/2010 | Ngo et al. |
| 2010/0281519 A1 | 11/2010 | Das et al. |
| 2011/0099604 A1 | 4/2011 | Zhou |
| 2011/0107406 A1 | 5/2011 | Frost et al. |
| 2011/0154231 A1 | 6/2011 | Cherdon |
| 2011/0191799 A1 | 8/2011 | Raza |
| 2011/0273294 A1 | 11/2011 | Harwell |
| 2011/0276683 A1 | 11/2011 | Goldschlag |
| 2011/0277027 A1 | 11/2011 | Hayton |
| 2011/0302629 A1 | 12/2011 | Whitson et al. |
| 2012/0005746 A1 | 1/2012 | Wei et al. |
| 2012/0117212 A1 | 5/2012 | Fries |
| 2012/0147894 A1 | 6/2012 | Mulligan |
| 2012/0265976 A1 | 10/2012 | Spiers et al. |
| 2012/0311564 A1 | 12/2012 | Khalid |
| 2012/0331524 A1 | 12/2012 | Mower et al. |
| 2013/0081112 A1 | 3/2013 | Kelly |
| 2013/0114610 A1 | 5/2013 | Polcyn |
| 2014/0013409 A1 | 1/2014 | Halageri |
| 2014/0172783 A1 | 6/2014 | Suzuki |
| 2014/0173594 A1 | 6/2014 | Ng et al. |
| 2014/0188676 A1 | 7/2014 | Marmolejo-Meillon |
| 2014/0337834 A1 | 11/2014 | Adogla |
| 2015/0020164 A1 | 1/2015 | Tankov |
| 2015/0067171 A1 | 3/2015 | Yum |
| 2015/0089620 A1 * | 3/2015 | Manza ................ H04L 63/0815 726/8 |
| 2015/0200821 A1 | 7/2015 | Sade |

(56) References Cited

U.S. PATENT DOCUMENTS

| | | |
|---|---|---|
| 2015/0227926 A1 | 8/2015 | Grigg |
| 2015/0264035 A1 | 9/2015 | Waterhouse |
| 2015/0304292 A1* | 10/2015 | Dulkin .................... H04L 63/08 726/7 |
| 2015/0350019 A1 | 12/2015 | Terayama |
| 2015/0381593 A1 | 12/2015 | Low |
| 2016/0234198 A1* | 8/2016 | Breiman ............. H04L 63/0815 |
| 2016/0286003 A1 | 9/2016 | Pessis |
| 2016/0299790 A1 | 10/2016 | Wagner |
| 2016/0301675 A1 | 10/2016 | Wiles |
| 2016/0308876 A1 | 10/2016 | Smith, III |
| 2016/0308906 A1 | 10/2016 | Hasson |
| 2017/0300687 A1 | 10/2017 | Cherukuri |
| 2018/0248916 A1 | 8/2018 | Hasson |

\* cited by examiner

SYSTEMS, METHODS, AND APPARATUSES FOR CREDENTIAL HANDLING

CROSS REFERENCE TO RELATED APPLICATIONS

This application is a continuation application of U.S. Non-Provisional patent application Ser. No. 15/634,317, filed on Jun. 27, 2017, and entitled "SYSTEMS, METHODS, AND APPARATUSES FOR CREDENTIAL HANDLING," which is a continuation-in-part application of U.S. Non-Provisional application Ser. No. 15/133,641, filed on Apr. 20, 2016, and entitled "METHOD AND APPARATUS FOR CREDENTIAL HANDLING," which claims the benefit of and priority to the earlier filing date under 35 U.S.C. § 119(e) of U.S. Provisional Application Ser. No. 62/150,051, filed on Apr. 20, 2015, and entitled "METHOD AND APPARATUS FOR CREDENTIAL HANDLING," and also claims the benefit of and priority to the earlier filing date under 35 U.S.C. § 119(e) of U.S. Provisional Application Ser. No. 62/355,083, filed on Jun. 27, 2016, and entitled "SYSTEMS, METHODS, AND APPARATUSES FOR CREDENTIAL HANDLING," the entireties of which are herein incorporated by reference.

BACKGROUND

Traditional means of authenticating access to computer systems and computer applications involve knowing a username and password. This results in a password being an important piece of information that needs to be protected since a password leak could lead to unauthorized access to computer systems or applications resulting in business losses. Remembering a multitude of usernames and passwords can be cumbersome and error-prone for a typical user, which can potentially lead to insecure practices such as using the same passwords across applications and systems which in turn increases the risk when a password is leaked.

Traditional two-factor authentication systems overcome some of these problems by using a physical token and password whereby just the loss of password does not compromise security. However, two-factor authentication can be expensive to install, use, maintain, and administer. In addition, many users are more familiar with single username and password use, and introducing a physical token and/or other means of delivering and using software tokens can result in productivity loss caused by having to adjust to a new security regime. Furthermore, various legacy applications and systems do not support two-factor authentication.

Restricting access to computer systems and applications to a select few individuals, carefully disseminating credential information, frequently changing passwords, monitoring, and auditing access are other traditional means of securing password use. But all of these approaches can be prone to human error resulting in password leakage either by accident, due to malware, phishing or some other cyber-attack.

Additionally, the storing and distributing of information across the internet by means of remote databases, web servers, web clients and web browsers, etc., has introduced another opportunity for insecurity that is not easily controlled due to the anonymous nature of the internet. In some scenarios, if the security of a computer has been compromised unbeknownst to the user, any information such as username and password entered by the user is thereby compromised as well.

When granting internal system access to third-party entities, the challenges of securing credentials multiply as an organization may not have complete control over security, operating, and business practices of a third-party.

Based on the foregoing, there is a need for secure and automated credential handling such that credentials are not revealed except at the point of need and transported to the endpoint or application (such as a web application) using cryptographically sound transport mechanisms.

BRIEF SUMMARY OF THE DISCLOSURE

According to one embodiment of the present disclosure, a method of selecting a web application, selecting a credential or credentials, and injecting said credential or credentials is described. In one embodiment, a method provides login access to a web endpoint by an accessor. In this scenario, an accessor using an access console may select the web endpoint from a list of endpoints to which a user or agent of a user may have access and requests access. Since the accessor has login access to the selected web endpoint, a privileged access management appliance (PAM appliance) will establish a session between a protocol agent that has network connectivity to that web endpoint and the accessor. Generally, the PAM appliance provides, in certain embodiments, an automated credential selection, injection and access mechanism that is secure, easy to use, provides granular access controls, and is implemented in a turn-key fashion. Similarly, the protocol agent directly connects with a web endpoint and facilitates the credential injection process (in various embodiments, with and without a connection to the PAM appliance).

Once the session between the protocol agent and the PAM appliance is established, the PAM appliance queries a credential manager to securely extract credentials that are available for this accessor on the selected web endpoint. The credentials are shown to the accessor as aliases of the actual credentials (e.g., code names, nick names, etc.). If only one credential is available or based on the accessor's choice when multiple credentials are available, the selected partial credential information is sent to the protocol agent by the PAM appliance. The protocol agent now requests the full credential information for the selected credential, and the full credential information is transported securely from the credential manager to the protocol agent via the PAM appliance. At no point in transport of credentials would the accessor or accessor's machine have access to the full credential information either encrypted or otherwise. At no point in transport would the PAM appliance have unencrypted access to the full credential information. Similarly, in one embodiment, the PAM appliance does not hold the keys for decryption of the credentials either. Once the transport is successfully completed to the protocol agent, the protocol agent launches an embedded web browser (or other web application), accesses the webs endpoint, and may securely inject the credential information for a successful login. The protocol agent may monitor the injection process and upon receiving a successful injection status, may establish a remote control session of a web site with the accessor. During the injection or if the injection were to fail, the accessor may not have access to the website, embedded web browser, web endpoint or to the protocol agent.

In various embodiments, methods for injecting credentials into web endpoints include programmatic injection of JavaScript, proxy-based credential injection into a protocol stream, automatically entering keystrokes into password fields, etc. In one embodiment, credentials are transported over a TLS data stream and may be protected by a single use private-public key pair valid for the duration of a single transfer. Establishment of this key-pair and encryption and decryption of credentials may be handled at the last process in the execution chain just before handing off a clear text credential to a web application or web site, and clear text credentials exists for the shortest duration of time possible in a secure memory buffer. Establishment of a remote control session of a web application or web site at the protocol agent may aid in creating a securely audited and recorded web session. The protocol agent may establish a controlled, monitored, and secure recording stream with the appliance such that the accessor does not have an opportunity to manipulate the recording stream thereby maintaining the integrity of the recorded session. The PAM appliance may maintain the integrity of the recording stream by interrupting the remote web site or web application access of the accessor if any anomalies, lag, or lack of data are detected in the recording stream from the protocol agent to the PAM appliance.

In some embodiments, the accessor may have access to two types of credentials for use: a non-privileged credential for login and a privileged credential to access sensitive information within the web site or web application. The accessor may gain access to the web endpoint using the non-privileged credential via a process described before. Once logged in and accessing the web endpoint, in access console, the accessor can chose a user interface (UI) mechanism to trigger a request for injecting privileged credentials into a specific area of the web endpoint. When the accessor chooses an area of the web page, the embedded web browser triggers the protocol agent to request privileged credentials specific to that area of the web endpoint, via the PAM appliance. In one embodiment, the PAM appliance forwards the request to the credential manager on behalf of the accessor. The mechanism to securely retrieve credentials and injection follows the same process as described in the prior embodiments.

For example, an organization may implement an embodiment of the present disclosure to prevent its employees, who should have access to its social media accounts (e.g., LinkedIn®, Facebook®, Twitter®, Instagram®, etc.), from actually possessing the login credentials for those accounts. Thus, if any one employee's computing device or personal files were compromised, the malicious individual who comprised the same could not gain access to the organization's social media accounts. Continuing with this example, when an employee wishes to navigate to www.facebook.com, he or she would select the web endpoint for Facebook in the access console, which automatically triggers the protocol agent to request the Facebook page and ready it for credential injection. Accordingly, the PAM appliance, as described herein, would forward the credentials request to the credential manager, which, if appropriately validated, would provide the requested credentials to the protocol agent (via the PAM appliance) for injection into the webpage. Once injected, the employee would be able to access and use the Facebook account. Furthermore, if the employee were to leave the company, his/her access can be easily denied without having to reset passwords, etc.

DESCRIPTION OF PREFERRED EMBODIMENTS

Figure 1A:
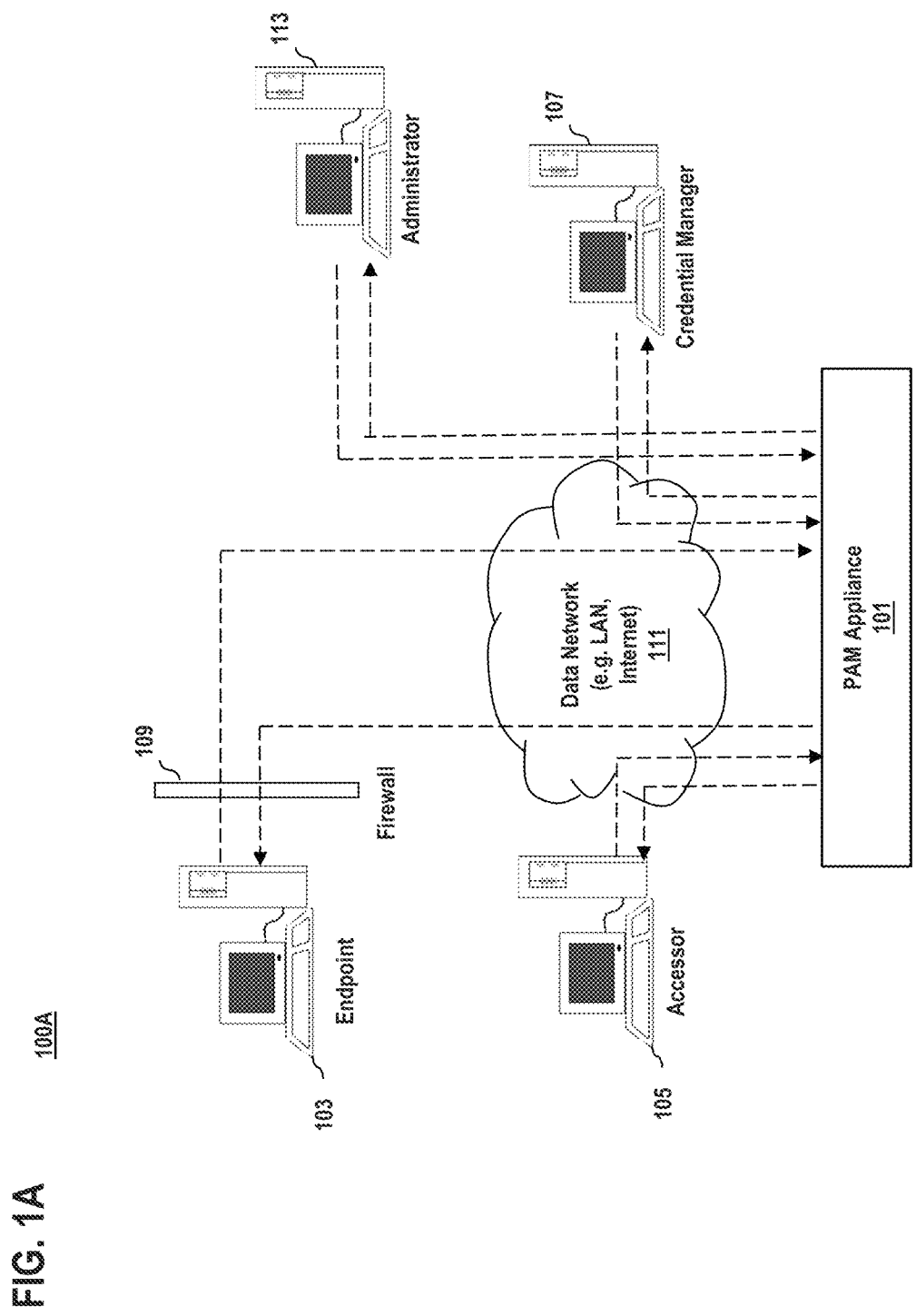
FIGS. 1A, 1B, 1C, and 1D are diagrams of systems and associated processes for automated credential handling, according to certain embodiments.

Apparatuses, methods, and systems for credential handling for secure and automated access to endpoints or applications is described. In the following description, for the purposes of explanation, numerous specific details are set forth in order to provide a thorough understanding of the embodiments of the disclosure. It is apparent, however, to one skilled in the art that the embodiments of the disclosure may be practiced without these specific details or with an equivalent arrangement. In other instances, well-known structures and devices are shown in block diagram form in order to avoid unnecessarily obscuring the embodiments of the disclosure.

When embodiments are described with respect to a wired network, it is contemplated that these embodiments have applicability to other networks including wireless systems. Similarly when embodiments are described with respect to computing devices they have applicability to physical, virtual, mobile, handheld, headless, and graphical devices and systems. Similarly when embodiments are described with respect to web applications, they have applicability to web sites, web clients, web servers, regardless of whether or not the applications include graphical elements.

As will be understood by one skilled in the art, the term and meaning of endpoint as used in the present disclosure is non-limiting to a local client. An endpoint or endpoint system may be, in various embodiments, a web client/web application, a web browser, a remote client, an end client, etc. In general, it should be understood based on the descriptions herein that the term endpoint may relate to any entity (e.g., computing device, processor, web application, web resource, etc.) that is a location or destination for information to be routed or addressed, such as credentials.

FIGS. 1A, 1B, 1C, and 1D are diagrams of a system and associated process for automating credential handling in order to gain access to endpoints or applications by accessors, protocol agents, and administrators, according to certain embodiments. For purposes of illustration, a communication system 100A (FIG. 1A) is described with respect to providing and enforcing real time access control to a customer network, as facilitated by a privileged access management appliance (PAM appliance) 101, between an endpoint system 103, accessor system 105, credential manager 107, and administrator system 113, thereby enabling, for example, automated credential handling for providing access to resources (including software or applications available, as well as storage/database and hardware capabilities) of the endpoint system 103. In certain embodiments, the systems may include the users of each system, such as the user of the endpoint system 103, user accessor of the accessor system 105, administrative user of the administrator system 113, and agent user of the protocol agent described under FIG. 3. The appliance 101 is further connected to the other systems through the data network 111. According to one embodiment, the appliance 101 can be implemented as a standalone hardware device; alternatively, the appliance 101 can be virtualized—i.e., virtual appliance. In certain embodiments, the appliance 101 may be referred to as the PAM appliance, network appliance, or just appliance.

In one embodiment, a PAM appliance 101 (e.g., along with or configured with a credential manager 107) provides, in certain embodiments, an automated credential selection, injection and access mechanism that is secure, easy to use, provides granular access controls, and implemented in a turn-key fashion. For the purposes of illustration, the appliance 101 can be deployed by an organization and accessed by entities that are either internal or external to that organization. In certain embodiments, the PAM appliance 101 can be implemented to accommodate access, credential selection, and injection from mobile systems and means to contact those mobile systems even when disconnected from the PAM appliance 101.

In the scenario of FIG. 1A, the deployed appliance 101 can serve as a website/web application access, remote access, access control, access management, audit, credential selection, credential injection, and reporting system for the organization. In one embodiment, the appliance is implemented according to an onsite deployment model. A hosted Software-as-a-Service (SaaS) model can also be an offering of this approach. In addition, the appliance can be further defined as a physical or virtual computing system. This can include but is not limited to a server rack-mountable server, non-rack-mountable server, desktop computer, laptop computer, or virtual machine.

Additionally, the PAM appliance 101 has the capability of allowing on-demand product use from anywhere in the world. For example, as long as the network appliance is deployed and accessible via a public IP address, an accessor or administrator can log in to his/her account via a web interface hosted on the network appliance or use a mobile application to connect to and gain access to the appliance or the endpoint and automatically select and inject credentials as long as he or she has such access.

An access console (e.g., local client, accessor application/client, or web client/web application, etc.) can be downloaded from a web interface for remote and secure access to endpoints, request credentials when needed, monitor ongoing sessions, and verify granted access. Also, an endpoint console (e.g., remote client, endpoint application/client, or web client/web application, etc.) can be downloaded from an administrative interface hosted on the PAM appliance 101—this endpoint client 103 can be further distributed to endpoints to enable them for secure remote access and credential injection. In another embodiment these clients can be downloaded from a third party's hosted or organization's self-hosted download location or mobile application store. In various embodiments, a protocol agent can be downloaded from an administrative interface hosted on the PAM appliance 101. This protocol agent further can be distributed to non-interconnected networks to enable them for remote and secure access and credential injection for web sites/web applications that are internal to those networks. Similar to endpoint clients 103, a protocol agent may be configured to automatically uninstall at the end of access period, session, or a certain number of web sessions for additional security.

The appliance 101, in various embodiments, executes applications that can receive, handle, manage, and dispatch system or data messages to and from the access consoles, protocol agents, web applications, and endpoint clients via a secure connection (e.g., 256-bit Advance Encryption Standard (AES) Transport Layer Security (TLS)).

As seen in FIG. 1A, an accessor system (or device) 105 can access an endpoint 103 via PAM appliance 101. The accessor system 105 may be a device attempting to access endpoint system (or device) 103 or resources of the endpoint system 103 through the network. The accessor system 105 also may be defined by unique characteristics such as IP address, MAC address, machine certificates, etc. In general, it should be understood based on the descriptions herein that an accessor or accessor system 105 may be any device, a human using a device, internal or external system, autonomous or user controlled computing environment, etc. that may access particular entities, such as endpoints, in a system or network. In one embodiment, the traffic between all systems, endpoint system 103, accessor system 105, administrator system 113, and credential manager 107 is handled and managed at the appliance 101. To facilitate the broadest reach and to easily work through firewalls and proxy servers, the system, in one embodiment, is designed such that all connections from the clients, agents, and managers are initiated outbound towards the appliance 101. In various embodiments, the connections and communications from a protocol agent 115 to accessed endpoints 103 (e.g., web sites, web applications, web clients, local clients, etc.) are also initiated outbound from the protocol agent 115 to the endpoints 103.

Figure 1B:
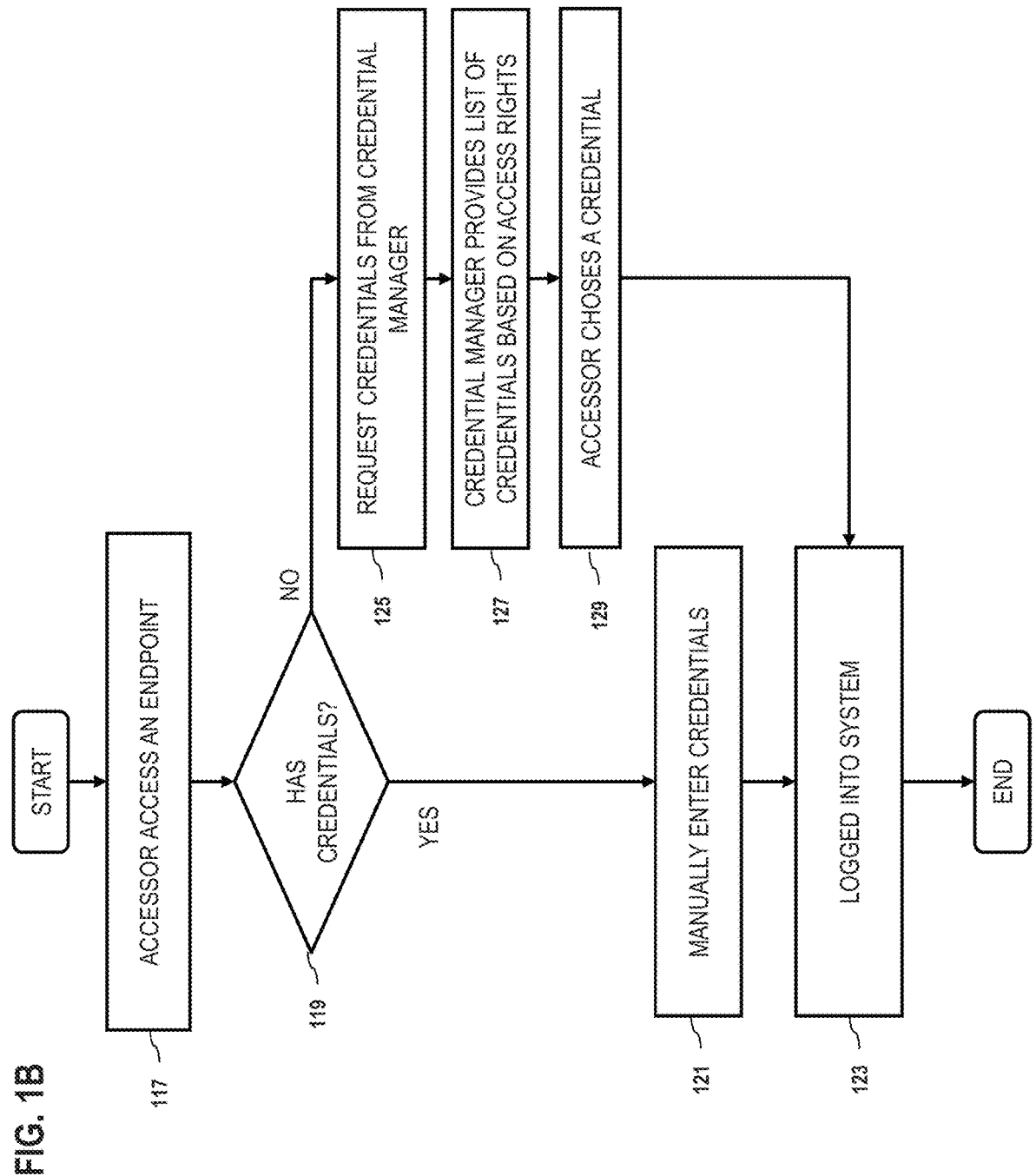

According to one embodiment, the operation 100B of the accessor system 105 is depicted in FIG. 1B. In step 117, the process detects an attempt to establish (or that a session has been established and is on-going) by an accessor system (or device) 105 a session with endpoint system 103 via appliance 101. In step 119, the PAM appliance 101 determines if the user accessor or accessor system 105 has credentials to access the resources at the endpoint system 103. Under such a scenario, the credentials may be received by the PAM appliance 101 from the credential manager 107 by the PAM appliance 101 querying the credential manager 107 on behalf of the accessor system 105. Based on such a determination of whether the credentials exist, the known credentials are then transmitted and/or openly provided to the endpoint system 103 for logging the accessor system 105 into the endpoint system 103, per step 121 and 123. In step 125, should no credentials be found for the accessor system 105 be found, the credential manager may provide a plurality of different credentials for the accessor device and/or user of the accessor device to select from. Under such a scenario, the set of credentials is requested by the PAM appliance 101 from the credential manager 107, and then, per step 127 transient identifiers for each of the credentials in the set are then provided to the accessor system 105. In certain embodiments, the credentials themselves are never provided directly to the accessor system 105 in order to maintain a strong security posture and confidentiality of the credentials themselves. In step 129, the accessor system 105, which has been provided with the set of credentials, then automatically selects or presents the set to the user of the accessor system 105. The provided credentials are selected from and the selected credential is provided to the PAM appliance 101 for logging into the endpoint system 103.

Figure 1C:
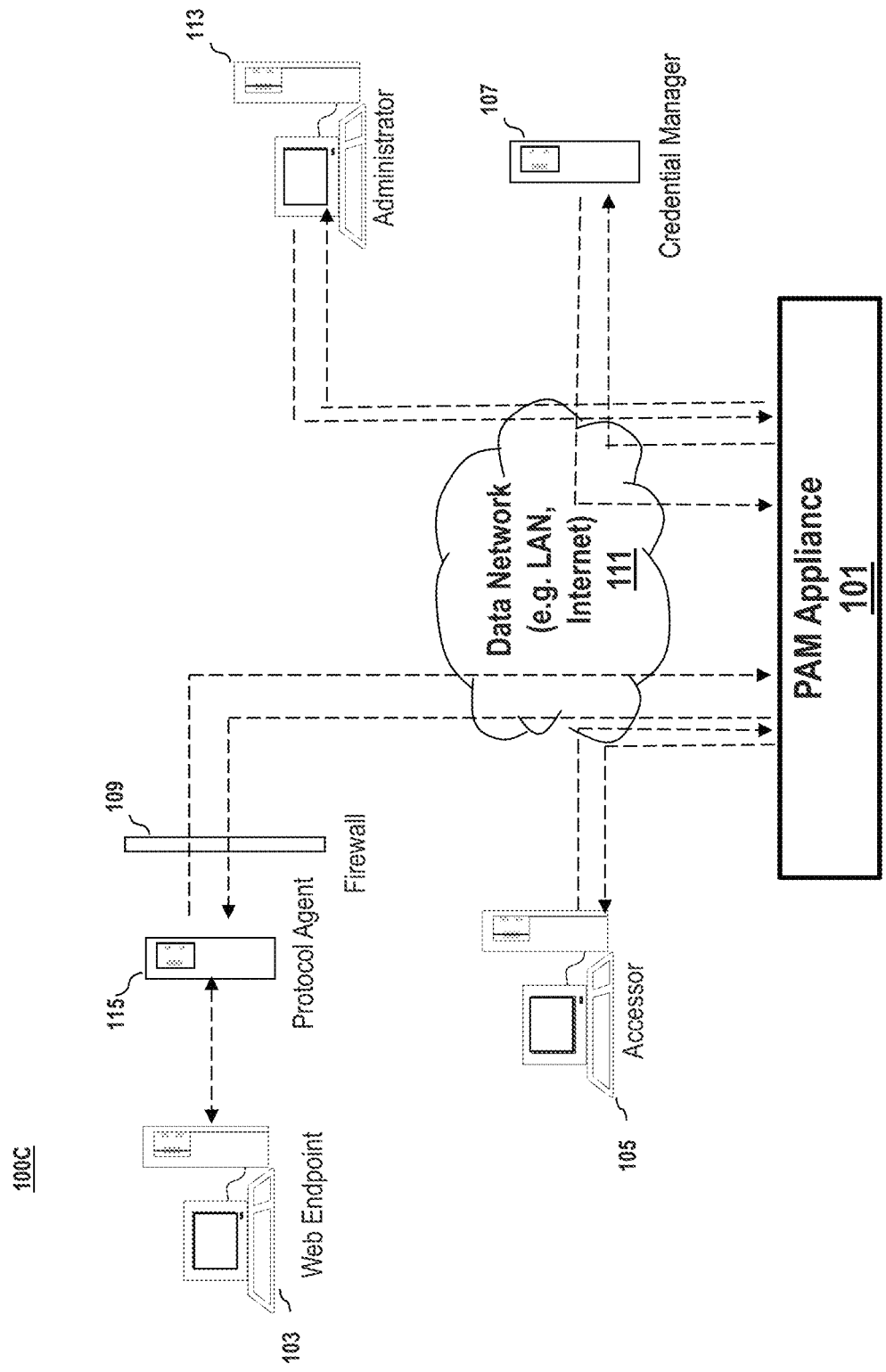

Referring now to FIG. 1C, an embodiment of a system 100C substantially similar to the embodiment in FIG. 1A is shown. In the present embodiment of the system 100C, a protocol agent 115 is configured to have a communication link with a web endpoint 103. Generally, the protocol agent 115 directly connects with a web endpoint and facilitates the credential injection process (in various embodiments, with and without a connection to the PAM appliance). In various embodiments, the protocol agent 115 may interact with a web endpoint 103, or other non-web endpoints, without the need to direct information or data through the PAM appliance 101. In one embodiment, the firewall 109 may monitor and secure the data communicated between the protocol agent 115 and the PAM appliance 101. In some embodiments, the protocol agent 115 may interact with other entities of internal or external systems in order to facilitate handling of information and data, such as credentials.

Figure 1D:
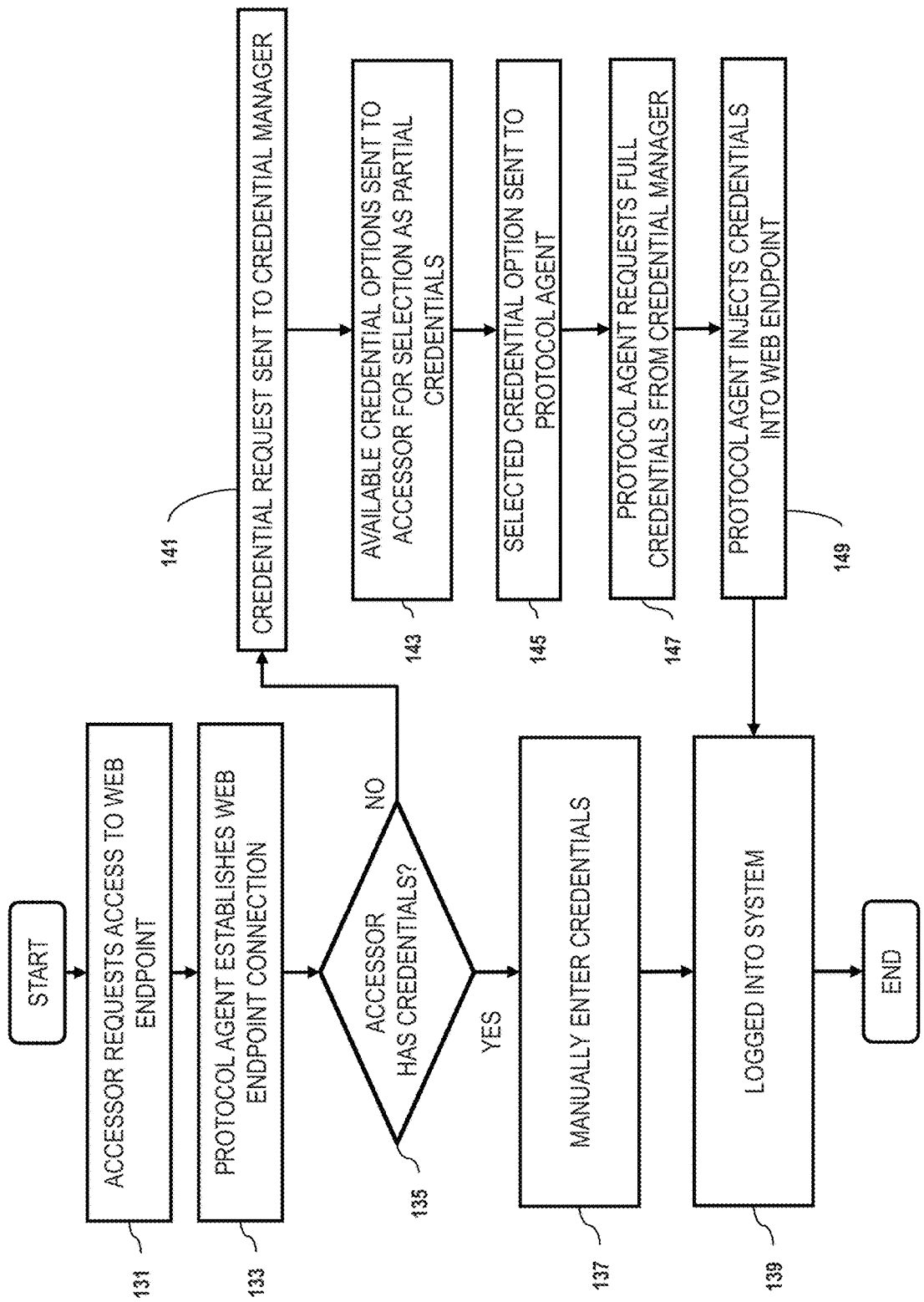

According to one embodiment of the present disclosure, the process of the accessor system 105 interacting with the protocol agent 115 in order to communicate with a web endpoint 103 is described in process 100D of FIG. 1D. In one embodiment, the process 100D begins at step 131 wherein the system may detect an attempt to establish (or that a session has been established and is on-going) by an accessor (or device) 105 a session with a web endpoint 103. In various embodiments, a web endpoint may be a web site, web client, web resource, etc. At step 133, the requested access by the accessor 105 to a web endpoint 103 may trigger a protocol agent 115 to establish a connection between the web endpoint 103 and the protocol agent 115. In some embodiments, once this connection is established, the protocol agent 115 may communicate directly with the web endpoint 103 without having to route or direct information through the PAM appliance 101. At step 135, the PAM appliance 101 determines if the accessor 105 has credentials to access the resources at the web endpoint 103. If the accessor 105 has the credentials to access the resources of the web endpoint 103, the user may manually enter those credentials and log into the system, at steps 137 and 139. If at step 135 it is determined the accessor 105 does not have the credentials for the system, a credential request is sent to the credential manager 107 at step 141. At step 143, the credential manager 107 may respond to the request from the accessor 105 for credentials by providing all available credentials, based on access rights, to the accessor 105 as aliases of the actual credential information. For example, in some embodiments, the credential manager 107 may provide the available credentials in the form of a code name, nick name, or other representation that is not the actual credential information. As shown in step 145, the accessor 105 may choose from the available credentials received from the credential manager 107, and then the selected credential information may be sent to the protocol agent 115. At step 147, the protocol agent 115 may request the full credential information from the credential manager 107, based on the partial and alias credential information selected by the accessor 105. In particular embodiments, the credential manager 107 may differentiate between requests from the protocol agent 115 and the accessor system 105. In one embodiment, in response to a request from the accessor system 105, the credential manager 107 may only provide the partial credential information. In certain embodiments, in response to a request from the protocol agent 115, the credential manager 107 may provide the full credentials.

According to various aspects of the present disclosure, because a user of the accessor system 105 is not directly exposed to the protocol agent 115, the full credentials remain protected and confidential. Shown at step 149, in response to the protocol agent 115 receiving the credentials from the credential manager 107, the protocol agent 115 may inject the credentials into the web endpoint 103 in order to gain log-in access to the system.

Figure 2A:
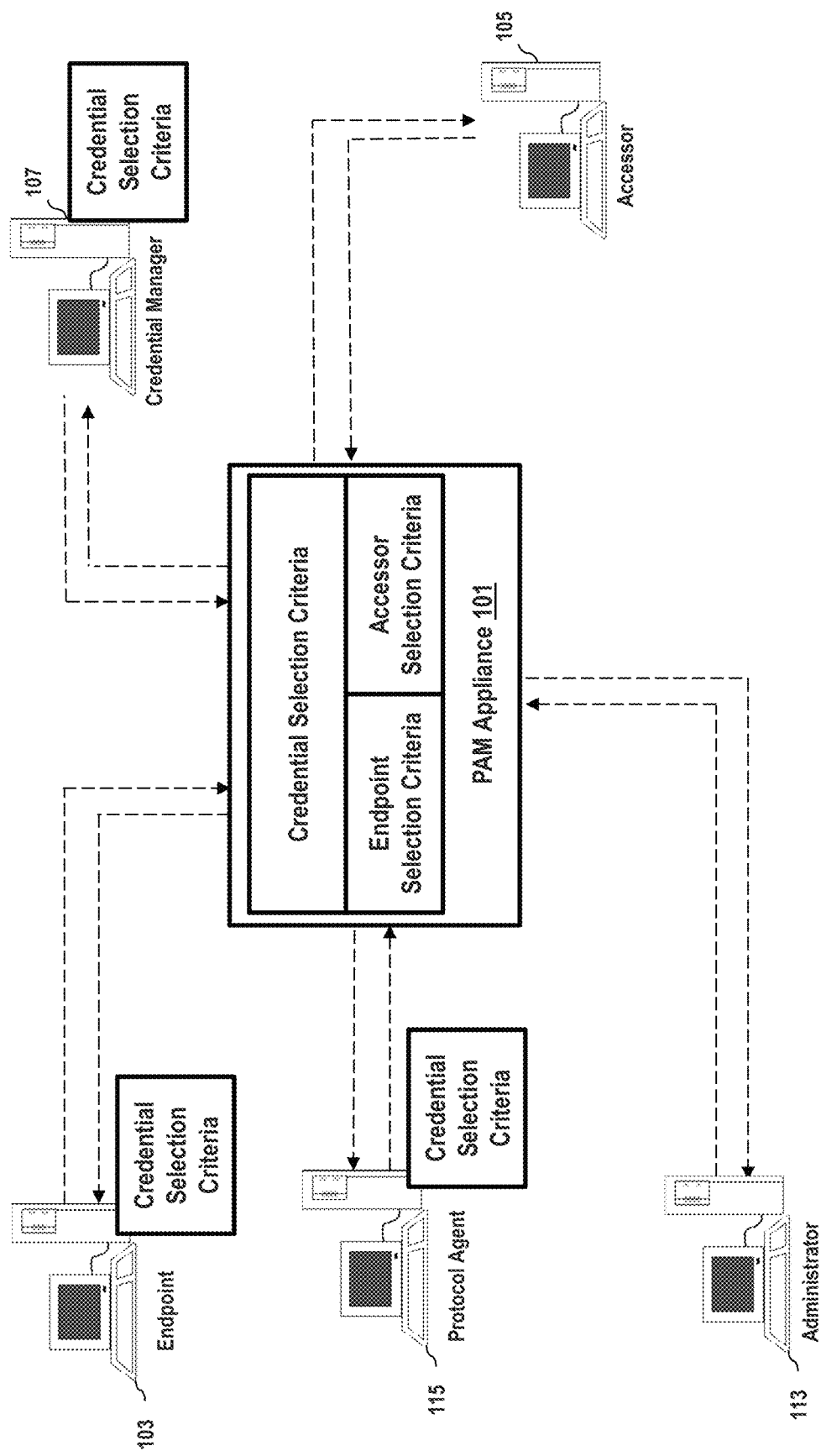
FIGS. 2A and 2B are diagrams of credential selection, granting, and injecting mechanism, according to certain embodiments.
Figure 2B:
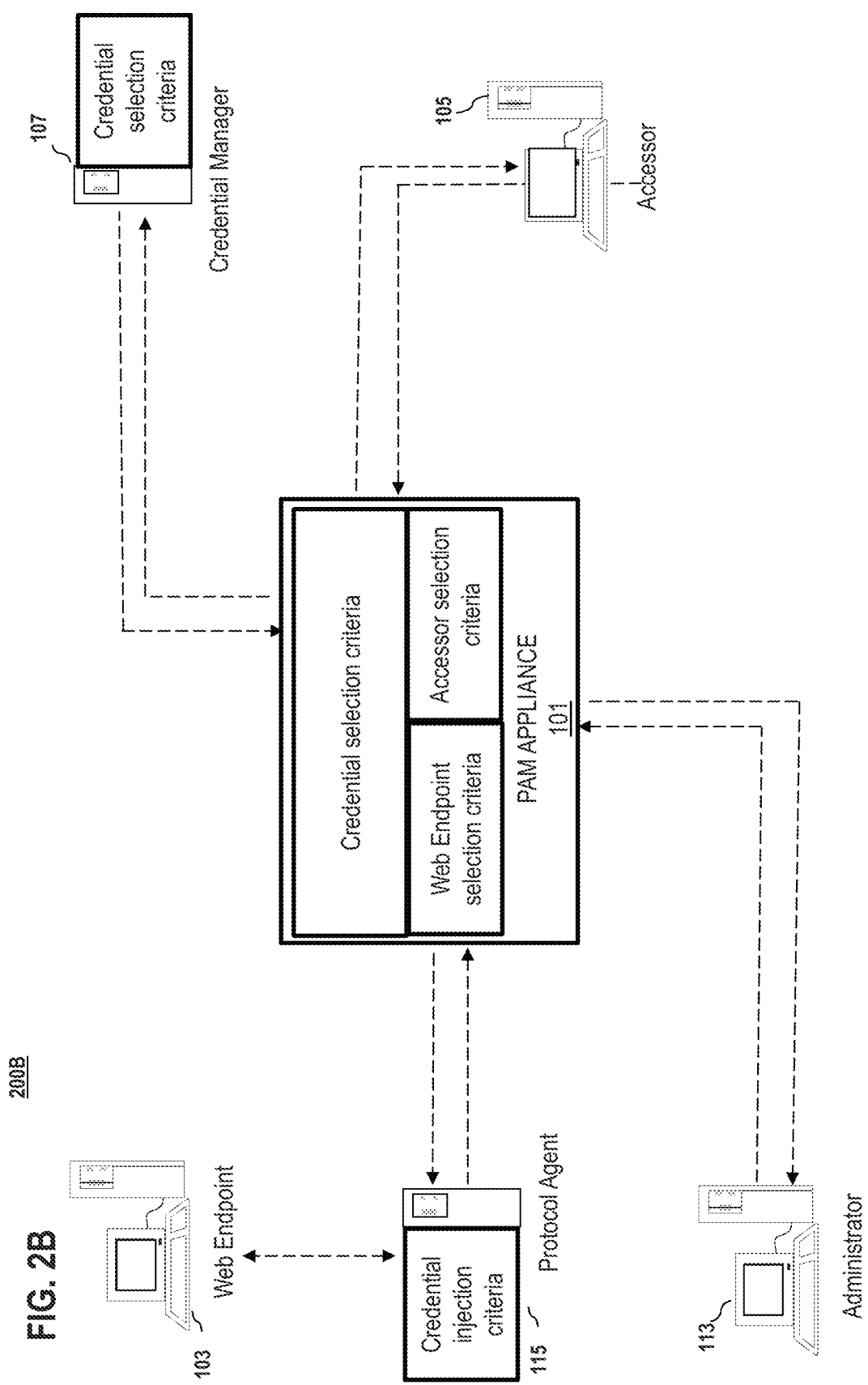

FIG. 2A and FIG. 2B are diagrams of systems for providing automated credential selection and injection, according to certain embodiments. In one embodiment, as shown by architecture 200A, a PAM appliance 101 and/or a credential manager 107 includes, among other means, a web server, applications, databases, downloadable installers, tools for appliance management, communication mechanisms, means for storing recordings, recording viewers, and self-checking mechanisms. Web applications and web management interfaces may be used by administrators in setting up credential and web endpoint selection criteria, assigning those criteria to an endpoint system 103, accessor system 105, web endpoints, accessors, and applications. Selection criteria can be established to restrict available credentials based on the accessor system 105, endpoint system 103, web endpoint, location of endpoint, location of accessor, application, method of access, time of day, and duration. Selection criteria can be established to use one or all of the available criteria or any combination thereof. Storage mechanisms, such as databases and encrypted key-value on-disk storage systems may be used for storing and retrieving credentials, criteria, event information, log data, and audit trails. As seen in the alternative architecture 200B of FIG. 2B, the protocol agent 115 may be configured to have a direct communication link with a web endpoint 103. In some embodiments, this direct communication link may allow for the protocol agent 115 to send information, such as credentials, to the web endpoint 103 without having to first direct the information through the PAM appliance 101. In one embodiment, the direct communication link between the protocol agent 115 and the web endpoint 103 is established in response to an accessor 105 requesting access to the web endpoint 103.

By way of example, two example approaches to selecting and injecting credentials according to various embodiments are described. In one embodiment, one approach provides login access to an endpoint by an accessor. In this scenario, an accessor, using an access console, selects the endpoint from a list of endpoints to which he or she has access and requests access. Since the accessor has login access to the selected endpoint, the PAM appliance 101 will establish a session between the endpoint and the accessor. Once the session is established, the PAM appliance 101 may contact the credential manager 107 to securely extract credentials that are available for this accessor system 105 on the endpoint system 103. Only the names, nick names, or other identification information of the credential may be shown to the accessor system 105 as choices. If only one credential is available or based on accessor choice when multiple are available, full credential information may be transported securely from the credential manager 107 to the requested endpoint via the PAM appliance 101.

In one embodiment, at no point in transport of credentials would the accessor or accessor's machine have access to the full credential information either encrypted or otherwise. Once the transport is successfully completed to an endpoint, the endpoint client will securely inject the credential information for a successful login. By way of example, injection mechanisms can range from programmatic methods like Windows Credential Provider, proxy-based credential injection into protocol stream, to automatically enter keystrokes or otherwise copy credential information into password fields, etc. In one embodiment, credentials are transported over a TLS data stream and are protected by a single use private-public key pair valid for the duration of a single transfer. In one embodiment, establishment of this key-pair, encryption and decryption of credentials is handled at a last process in the execution chain just before handing off a clear text credential to an application or OS process and clear text credential exists for the shortest duration of time possible.

In one embodiment, credential information may be "rotated" after injection. In various embodiments, rotation of credential information includes modifying the credential information after it has been injected into an endpoint. According to various aspects of the present disclosure, rotating credential information further includes creating new usernames, new passwords, or a combination thereof, in order to further protect against security breaches. In some embodiments, rotating credentials includes re-associating preexisting usernames and passwords without the need to create new credentials. For example, a password corresponding to a particular username may be swapped with a new password after injection into an endpoint, or after a predetermined number of injections. In various embodiments, because users may not have access to password information, they are generally unaware that the rotation process has occurred. In particular embodiments, the PAM system facilitates the credential information rotation and, in response, the credential manager is updated. In other embodiments, the credential information is rotated by the protocol agent after completion of access by the accessor device. In certain embodiments, rotating credential information allows for increased integrity of the credential information as well as the endpoints being accessed.

In another approach, the accessor has access to two types of credentials for use: a non-privileged credential for login and a privileged credential (e.g., for use as Run As in Windows environments). Under this scenario or embodiment, an accessor will gain access to the endpoint using the non-privileged credential, for instance, via a process described previously. Once logged in and accessing the endpoint, via an access console, the accessor can chose a UI mechanism to run applications on the end point as a different user. The UI mechanism is either shown as part of the access console where the accessor chooses an application from a list or types a freeform command, or it is shown on the end point, through screen sharing, as part of selecting an application or command that should be run as a different user. Upon selection of the application or command, the PAM appliance 101 will contact the credential manager 107 on behalf of the accessor, securely retrieve credentials, and, if only one is available, transport it to endpoint for use to launch the selected application or command using the provided credential. If multiple privileged credentials are available, a list of names, nicknames, or other identifiers of the credentials are displayed to the accessor. In one embodiment, at no point in transport of the credentials would the accessor or accessor's machine have access to the full credential information either encrypted or otherwise. Windows specific mechanisms are outlined for illustrative purposes—similar mechanisms exist and are available for use on other operating systems and platforms. In one embodiment, accessors 105, administrators 113, and endpoints 103 can either be internal or external to the organization that owns PAM appliance 101. Credential selection and injection can be enforced in any combination of available credentials, location, method of use, grouping, privilege level, and approval. In one embodiment, an accessor can gain access to a credential only for a particular endpoint for a certain duration and only on a certain day and only when accessing from a desktop computer on the internal LAN of the organization, etc. As another embodiment, an accessor can access a credential for use on any endpoint but only at a certain time of day for certain duration and only for a certain application on the endpoint while not on the internal network but can use that credential for any application while on the internal network of the organization. These embodiments are provided by way of illustration and not limitation. Accordingly, it is contemplated that any temporal or other restriction or policy can be applied to control access to credentials.

In one embodiment, the credential manager 107 can store, retrieve, and manage credentials by itself or make use of a pre-existing credential handling entity. When using a pre-existing entity, the credential manager 107 can act as middleware to integrate with a single or a plurality of credential handling and management entities.

Figure 3:
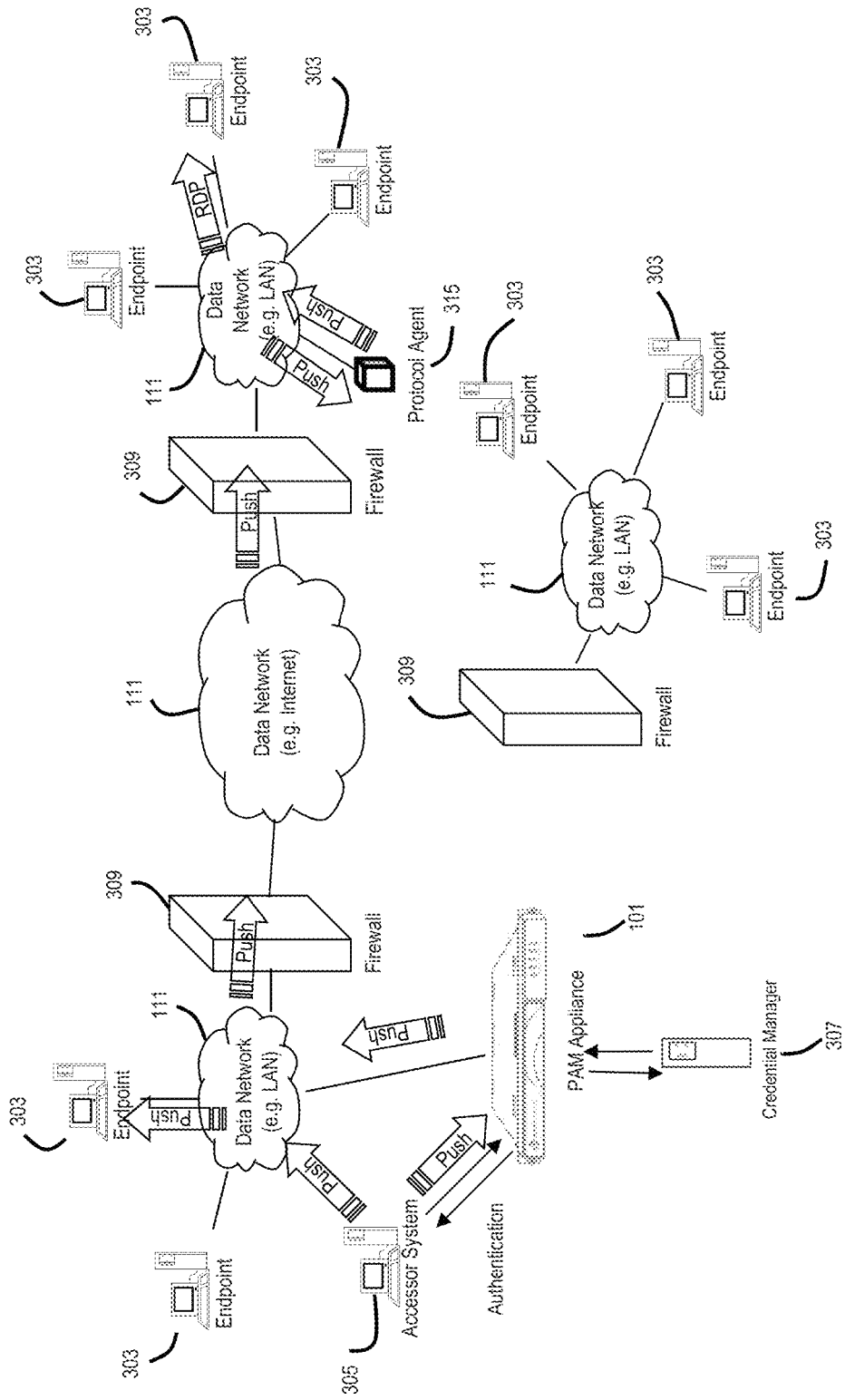
FIG. 3 is a diagram of a system capable of providing clientless access within local area network (LAN) as well as remote networks while automatically injecting credentials at endpoints, according to one embodiment.

FIG. 3 is a diagram 300 illustrating clientless access to endpoints with automated credential handling. This diagram illustrates a system and associated processes for providing access to endpoints via a PAM appliance 101 and/or credential manager 307 as an agent or a proxy, according to certain embodiments. In this embodiment endpoint access application is pushed to an endpoint, executed, and connected back to the accessor via the PAM appliance 101. Push action can be achieved either directly from the PAM appliance 101 or via the means of a protocol agent 315. In one embodiment, the protocol agent 315 directly connects with a web endpoint and facilitates the credential injection process (in various embodiments, with and without a connection to the PAM appliance).

In one embodiment, the protocol agent 315 connects to the end point using Remote Desktop Protocol (RDP) and connects to the PAM appliance 101 using a proprietary protocol. In this embodiment, RDP access is restricted to the endpoints from the public internet, but since the protocol agent 315 can connect outbound to the appliance and can connect using RDP inbound to the endpoint on local LAN, the protocol agent 315 has effectively and securely bridged access between disparate networks and protocols. In other embodiments protocols like Virtual Network Computing (VNC), Secure Shell (SSH), Hypertext Transfer Protocol (HTTP), HTTPS, Open Database Connectivity (ODBC), and Intel® vPro™ are bridged. While accessing endpoint via a protocol agent 315, an accessor can request, select, and inject credentials. This selection and injection would follow a similar model as described above. In cases where endpoint credential injection directly at the endpoint is not feasible, the protocol agent 315 is used to affect credential injection. In this method full credential information does not traverse through the accessor machine. Similarly, in another embodiment, full credential information is not provided to the endpoint either. In such embodiments, the protocol agent 315 has access to the full credential for use on endpoint. In certain embodiments mechanisms such as Kerberos and NT LAN Manager (NTLM) are used to establish a session between an accessor's access console and an endpoint either directly or via the PAM appliance In one embodiment, a plurality of accessors 305 can access the system at any given time. While the accessors 305 are in access sessions with endpoints 303 they can invite other accessors 305 into their session to provide guidance or help. Invited accessors 305 can select and inject credentials available to them on this endpoint 303 based on the selection criteria as defined by the administrator and enforced by the credential manager 307 and/or PAM appliance 101.

In certain embodiments, the PAM appliance 101, credential manager 307, and protocol agent 315 may comprise the same appliance.

Figure 4:
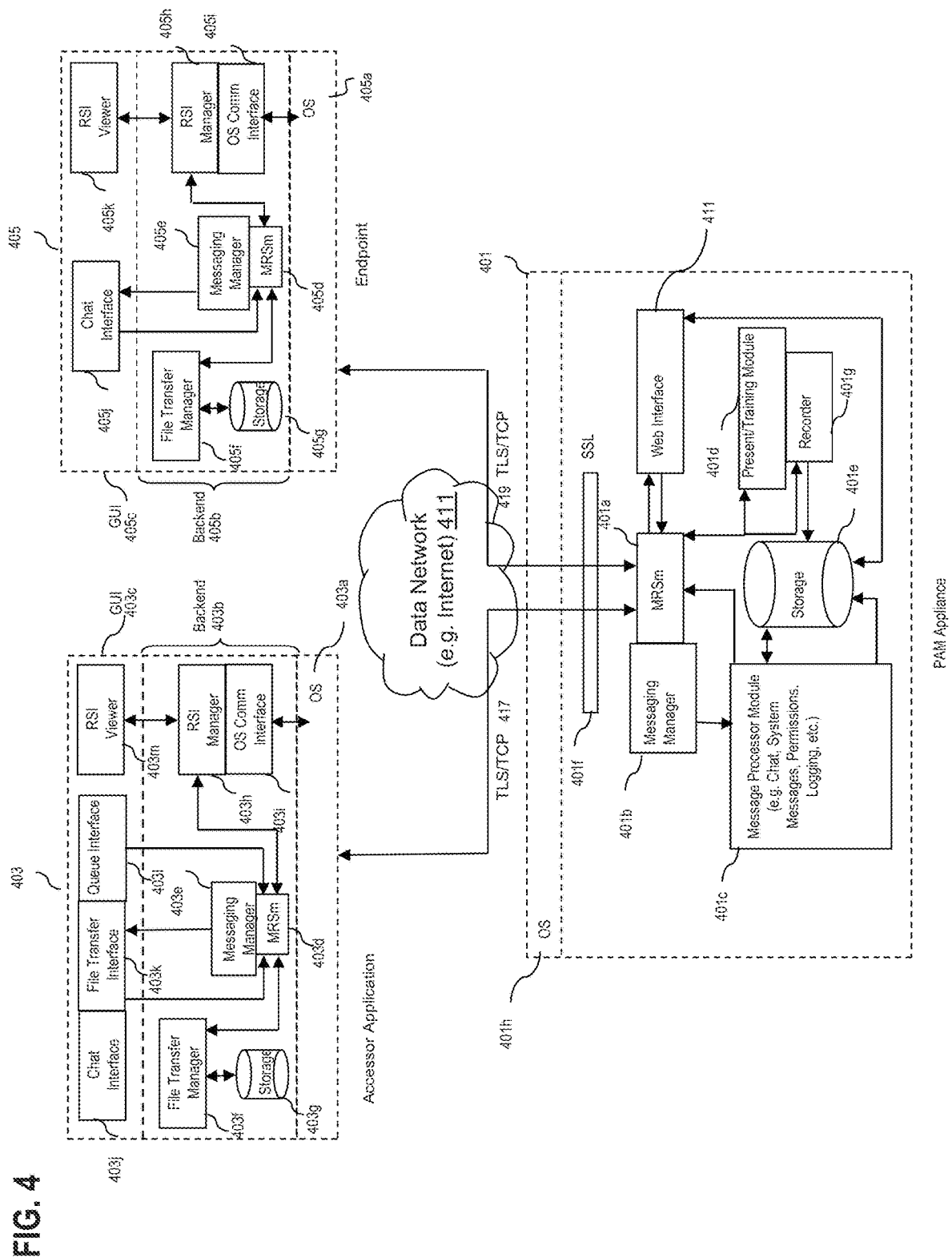
FIG. 4 is a diagram of the software architecture of the communication system of FIGS. 1A, 1C, 5, and 6 according to one embodiment.

FIG. 4 is a diagram of the software architecture 400 of the communication system of FIG. 1, according to one embodiment. FIG. 4 illustrates various tools that are available in an access session, the communication mechanism for effective use of these tools in an access session via the PAM appliance under one embodiment. The product data transfer architecture, in one embodiment, is designed with the basis of a message handling and routing system called the Message Router System (MRS) which includes a collection of MRS modules (i.e., MRSm 401a). The MRS provides a message routing engine that enables the routing of data from one router to another router. The MRSm's 401a, 403d, and 405d provide a message routing system that enables the routing of data within envelopes among the appliance 401, accessor system 403 and endpoint system 405 with, for example, mailboxes as data endpoints. The mailboxes, which can be used for sending and receiving data, are also responsible for handling of encoding (creation) and decoding of message envelopes with appropriately designed read and write methods. By way of example, the message envelope can include the following fields: a fromRouterID field specifying an identifier associated with the MRS 401a, a toRouterAddress field specifying addressing information of the destination routing module.

In addition to the above described inter-router communication, the MRS can communicate with other modules within the application, including the appliance application, endpoint application, and the access console application, for example. These router instances provide the means for delivering the appropriate messages to destination modules within their respective applications.

In addition, the MRS 401a can communicate with other modules in a manner similar to that described above. By way of example, the MRSm 401a can communicate with the web interface 411, a message manager 401b, a message processor module 401c (includes chat, permission, logging, etc), a present/training 401d, a secure layer module 401f (e.g., SSL wrapper module), and a recorder module 401g. The web interface 411 can communicate with other application modules via the MRS 401a.

In an exemplary embodiment, the web interface 411 includes the following: (1) a network configuration web interface; (2) a User/Admin web interface which includes but not limited to user profile configuration, log reporting interface, and administrative user interface. According to one embodiment, the web interface provides functions for configuring the appliance 401 to be deployed and integrated into the network infrastructure of the installer. In one embodiment, all other interfaces can communicate through the MRSm 401a or to a storage module 401e directly.

For ensuring proper dispatching of system messages received at the MRSm 401a, a message manager 401b can be used in this exemplary embodiment. These messages can include such data as chat data, session system data logging, system message posting, and system message queries, etc.

The message processor module 401c receives system messages from MRSm 401a via the message manager module 401b. These messages can include such data as approval requests, notification requests, approval responses, session system data logging, system message posting, system message queries, permissions queries, and storage data retrievals, etc.

The viewer module 401d is configured to reduce the amount of screen update data transmitted from the client-side. In an exemplary embodiment, the viewer module 401d includes the following components (not shown): a viewer component, and one or more remote screen image servers. These servers collect RSI change updates and send them on to the RSI viewer via the MRSm 401a. The viewer component receives RSI update data from a client-side (remote-side in this case) server via the MRSm 401a and then sends the data off to the active servers to be transmitted to the appropriate destination. The main stream of RSI update data can be transmitted to the appropriate client via the MRSm 401a. Another stream of screen update data is transmitted to the recorder module 401g to be written into the storage module 401e.

The SSL module 401f ensures that the data transfer between the appliance 401 and the accessor and endpoint system (403 and 405) is encrypted, e.g., 256-bit AES SSL encryption over links 417 and 419.

In one embodiment, the remote access and control appliance 401 utilizes an operating system (OS) 401h that supports a variety of applications. For example, a web server application can run on top of the OS 401h to provide web hosting capabilities. The OS 401h can also support SSL. The SSL wrapper module 401f provides SSL over Transmission Control Protocol (TCP) or other network protocols.

As described, in one embodiment, the network appliance utilizes an OS 401h with a web server for providing web hosting capabilities. The routing and handling module (e.g., MRSm) 401a, which is a transport layer atop the OS 401h, provides various network facilities. Accordingly, MRSm 401a provides the generic means of transporting data from one system to another.

The MRSm 401a of the network appliance 401 can communicate with the endpoint application of endpoint system 405, and the accessor application of the accessor system 403 or another appliance.

Under this example, the accessor system 403 and endpoint system 405 include operating systems 403a, 405a; backend components 403b, 405b; and GUIs 403c, 405c. The backend components 403b of the accessor system 403 can include a MRSm 403d, a message manager module 403e, and a file transfer manager module 403f The module 403f interfaces with a storage module 403g, which is configured to store retrieved content stemming from the operation of the file transfer manager module 403f. The backend components 403b also include a RSI manager module 403h. Yet another module 403i (i.e., OS interface module), which is integral to the backend components 403b, provides communication interfaces to the OS 403a. As shown, the backend components 405b of the endpoint system 405 resemble that of the backend components 403b of the accessor system 403: a MRSm 405d, a message manager module 405e, and a file transfer manager module 405f, a storage module 405g, a RSI manager module 405h, an OS interface module 405i.

As for the GUI 403c, the accessor system 403 can provide a number of interfaces depending on the applications. For instance, the GUI 403c can include a chat interface 403j, a file transfer interface 403k, a queue interface 403l, and a viewer 403m. In this example, the endpoint system 405 utilizes a chat interface 405j and a viewer 405k. The GUI 403c can include other interfaces such as remote command shell, system diagnostics, and system information to name a few. The GUI 405c can include application specific chooser interface to only allow specific application viewing.

As explained with respect to the operation of the network appliance 401, the MRSm 403d is the medium for handling all messages coming to the accessor application 421 and all messages sent from the accessor application 421. The MRSm 403d communicates with the message manager 403e, a RSI manager 403h, and the file-transfer manager modules 403f The system messages, session data, and chat data are delivered to the message manager module 403e. The MRSm 403d sends, as well as receives, system/control messages and RSI update data to and from the RSI manager module 403h. The MRSm 403d interacts with the file-transfer manager 403f in sending and receiving system messages and file-transfer data.

The file-transfer manager 403f handles all remote-to-local and local-to-remote (i.e. between the accessor system and the endpoint system) reading and writing of files. The system messages and file-transfer data are received and sent through the MRSm 403d. Notably, the file-transfer interface module 403k on the GUI component 403c receives data from the MRSm 403d and sends all data directly to the MRSm 403d. Assuming the permissions to the endpoint file system access have been granted, the processes and steps involved in transferring a file from accessor storage 403g to the endpoint storage 405g include an initiation of a file transfer from the file-transfer GUI, a system command message sent to the MRSm 403d. MRSm 403d delivers the command to the file-transfer manager module 403f to execute on constructing the data to be sent to MRSm 405d of the endpoint system 405 via the MRSm 403d. A system notification message is delivered to the message manager 403e via MRSm 403d to be displayed in the chat GUI 403j after being delivered there by the message manager 403e. The processes and steps involved in transferring a file from the endpoint to the accessor include an initiation from the file-transfer GUI 405k, a system command message sent to the file-transfer manager 405f via the endpoint MRSm 405d. The file-transfer manager 405f constructs a proper remote file transfer request, which is then sent through the endpoint MRSm 405d to the accessor MRSm 403d through the MRSm 401a on the appliance. The accessor MRSm 403d receives the request command, delivering it to the remote file-transfer manager 403f, which in turn, receives the file system data requested to be transmitted back to the endpoint MRSm 405d by the accessor MRSm 403d through the MRSm 401a on the appliance. The accessor MRS 403d delivers the file system data received from the endpoint MRS 405d to the file-transfer manager 403f for processing and storing in the local file system storage 403g. Also, a system notification message as well as a file-transfer GUI refresh command is delivered to the file-transfer GUI 403k via the dispatcher 403e from the MRS 403d.

The RSI manager modules 403h and 405h, in one embodiment, includes the following components: a RSI updater, which "paints" the RSI viewer GUIs 403m and 405k with RSI screen update data; RSI server, which utilizes the OS communication interface modules 403i and 405i. The OS communication interface modules 403i and 405i interfaces with the OS system 403a and 405a for detecting and listening for screen and system updates, collecting these updates, and packaging and encoding these updates into data to be then sent to the viewing system via the respective MRSm's.

The RSI manager modules 403h and 405h can also provide the capability of reverse viewing. In this mode, the viewing of the remote system is reversed to being viewed by the remote system.

The network appliance 401 also permit support representatives to predict and lower the total cost of ownership (TCO) vis-à-vis the ASP model, in which the support representatives are typically charged a monthly fee. With the network appliance 401, representatives can predict their budget without monthly fees, surcharges or overages.

Figure 5:
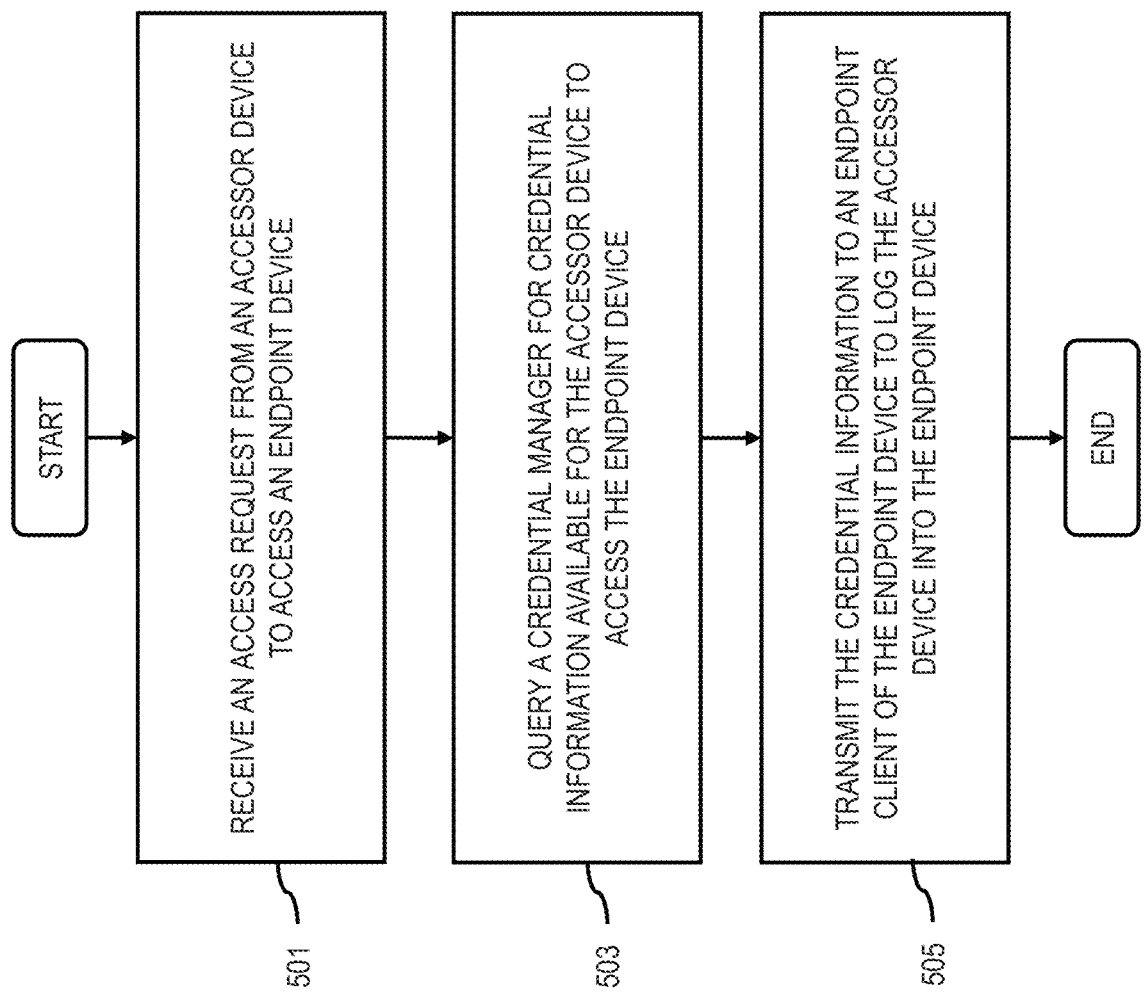
FIG. 5 is a flowchart of a process for securely and automatically handling credentials, according to one example embodiment.

FIG. 5 is a flowchart of a process 500 for securely and automatically handling credentials, according to one example embodiment.

In step 501, the PAM appliance 101 receives an access request for an endpoint device 103 (e.g., web end point) by an accessor device 105. In some embodiments, the endpoint device 103 is one of a plurality of endpoint devices within a network (or on the Internet), and the PAM appliance 101 manages access rights to the plurality of endpoint devices within the network. In one embodiment, the PAM appliance 101 also manages network traffic among the plurality of endpoint devices, the accessor device 105, the credential manager 107, and other systems of the network (e.g., administrator device 113). In some embodiments, the access request may also be for privileged resources at the endpoint device 103 and not just only for access to the endpoint itself, but specific to the resource. Which may then proceed with the same process of providing access to the resource, thus the access is specific to the privileged resource of the endpoint 103 and not just the endpoint 103 in general.

In step 503, the PAM appliance 101 queries a credential manager 107 for credential information available for the accessor device 105 to access the endpoint device 103 based on an access policy assigned to the endpoint device 103. In one embodiment, the credential information may include non-privileged and privileged information, of which non-privileged information may be transmitted to the endpoint client for login of the accessor device 103 into the endpoint device 103.

In step 505, the PAM appliance 101 transmits the credential information to an endpoint client (e.g., an application or web client) of the endpoint device 103 to log the accessor device 105 into the endpoint device. In certain embodiments, the credential information is transmitted to the endpoint client 103 using a secure data stream and/or an encryption mechanism (e.g., use of encryption keys valid for the duration of a single transfer). In certain embodiments the endpoint client may log the accessor device 105 into the endpoint device 103 through an injection mechanism. The injection mechanism may include a programmatic method, a proxy-based credential injection into a protocol stream, an automatic keystroke entry, and/or a copying of the credential information into corresponding log-in fields.

Figure 6:
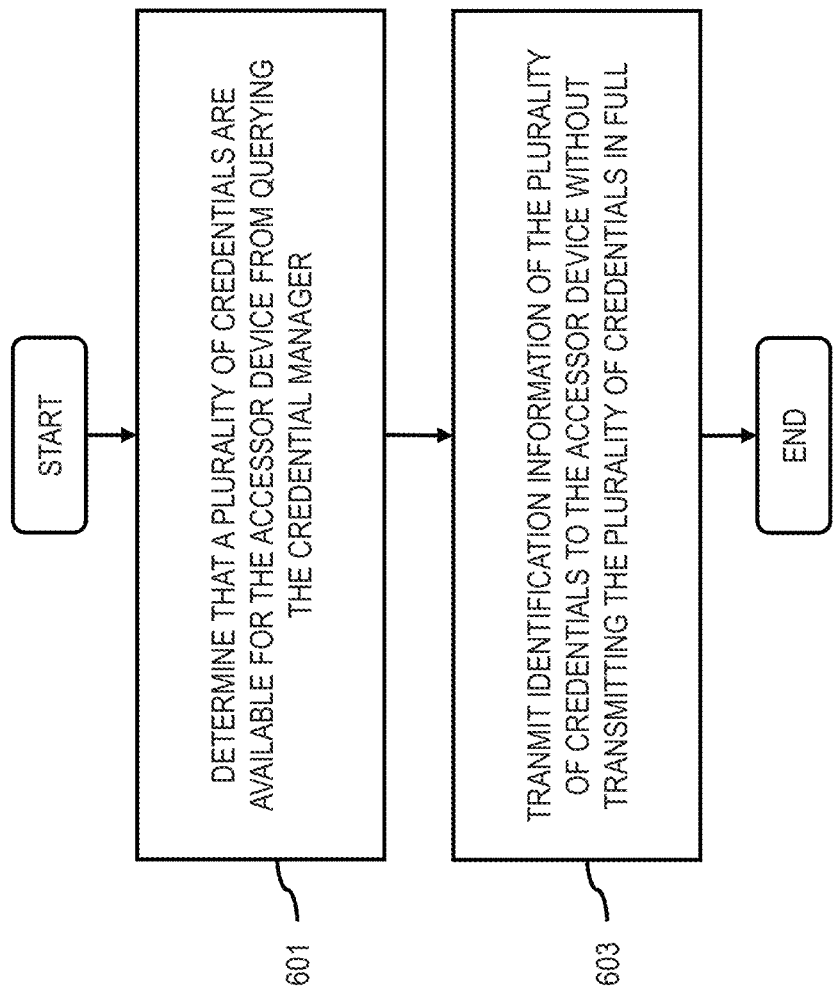
FIG. 6 is a flowchart of a process for handling a plurality of credentials, according to one example embodiment.

FIG. 6 is a flowchart of a process 600 for handling a plurality of credentials, according to one example embodiment.

In step 601, the PAM appliance 101 determines that a plurality of credentials are available for the accessor device 105 and/or user of the accessor device 105 as queried from the credential manager 107, in order to provide access to the endpoint device 103 by the accessor device 105. In one embodiment, the plurality of credentials are privileged credentials, where the privileged credentials are also not provided to the accessor device 105 or an accessor client (e.g., application or web client).

In step 603, the PAM appliance 101 then transmits the identification information of the plurality of credentials (as well as privileged credentials) to the accessor device 105 and/or user of the accessor device without transmitting the plurality of credentials in full. The accessor device 105 then selects the credential information to use for access to the endpoint device 103, by selecting from a list generated using the identification information to represent the plurality of credentials. In some embodiments, each of the plurality of credentials may have a specific identification information associated with it. The identification information for the credentials may include name, nickname, and/or other identifier for the credential.

Figure 7:
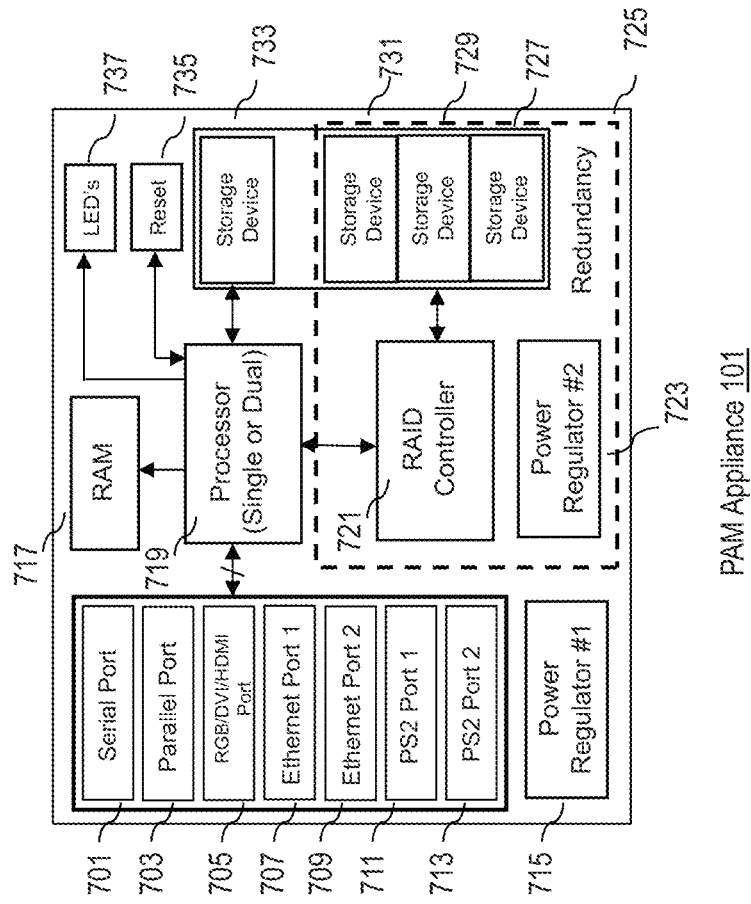
FIG. 7 is an exemplary hardware architecture of a remote access and control appliance, according to one embodiment.

FIG. 7 is an exemplary hardware architecture 700 of a remote access and control appliance, according to an exemplary embodiment. The network appliance 101, in one embodiment, comprises various component interfaces, including serial and parallel ports 701 and 703, a display interface (e.g., an RGB (Red, Green and Blue) port 705), local area network (LAN) ports (e.g., Ethernet ports) 707 and 709, and input device ports (e.g., PS2) 711 and 713. In one embodiment, the network appliance 101 also contains a power regulator 715, internal memory in the form of RAM (Random Access Memory) 717, one or more processors 719, each which may be a multi-core processor, LEDs (Light Emitting Diodes) 737, reset control 735 and a SATA (Serial Advanced Technology Attachment) storage drive 733.

As mentioned, the network appliance 101, in an exemplary embodiment, can be a 1U rack-mountable server hardware. However, it is contemplated that configurations other than those illustrated in FIG. 7 can be constructed, depending on the particular applications. For example, different types of appliances can be designed for different uptime requirements. With uptime-critical customers, the network appliance 101 provides for fail-over redundancies; e.g., use of multiple disk drives 727-731, for Fail-over and Hot-Swap capabilities via a RAID (Redundant Array of Independent Disks) controller 721. This configuration of the appliance 101 can also be equipped with a backup AC-DC (Alternating Current-Direct Current) regulator 723, which can be triggered when the main regulator 715 is detected as non-functional. Alternatively, for non-uptime-critical customers, the network appliance 101 can be configured without the additional hardware and/or software required for providing redundancies.

As earlier described, the network appliance 101, in an exemplary embodiment, can be a virtual appliance. Such software appliance can be run in a virtual environment. For instance, an image of the operating system and base software application can be installed on a virtual machine. Virtualization provides an abstraction layer that separates the operating system from the hardware, as to permit resource sharing. In this matter, different virtual machines (using heterogeneous operating systems) can co-exist on the same hardware platform.

The processes described herein may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
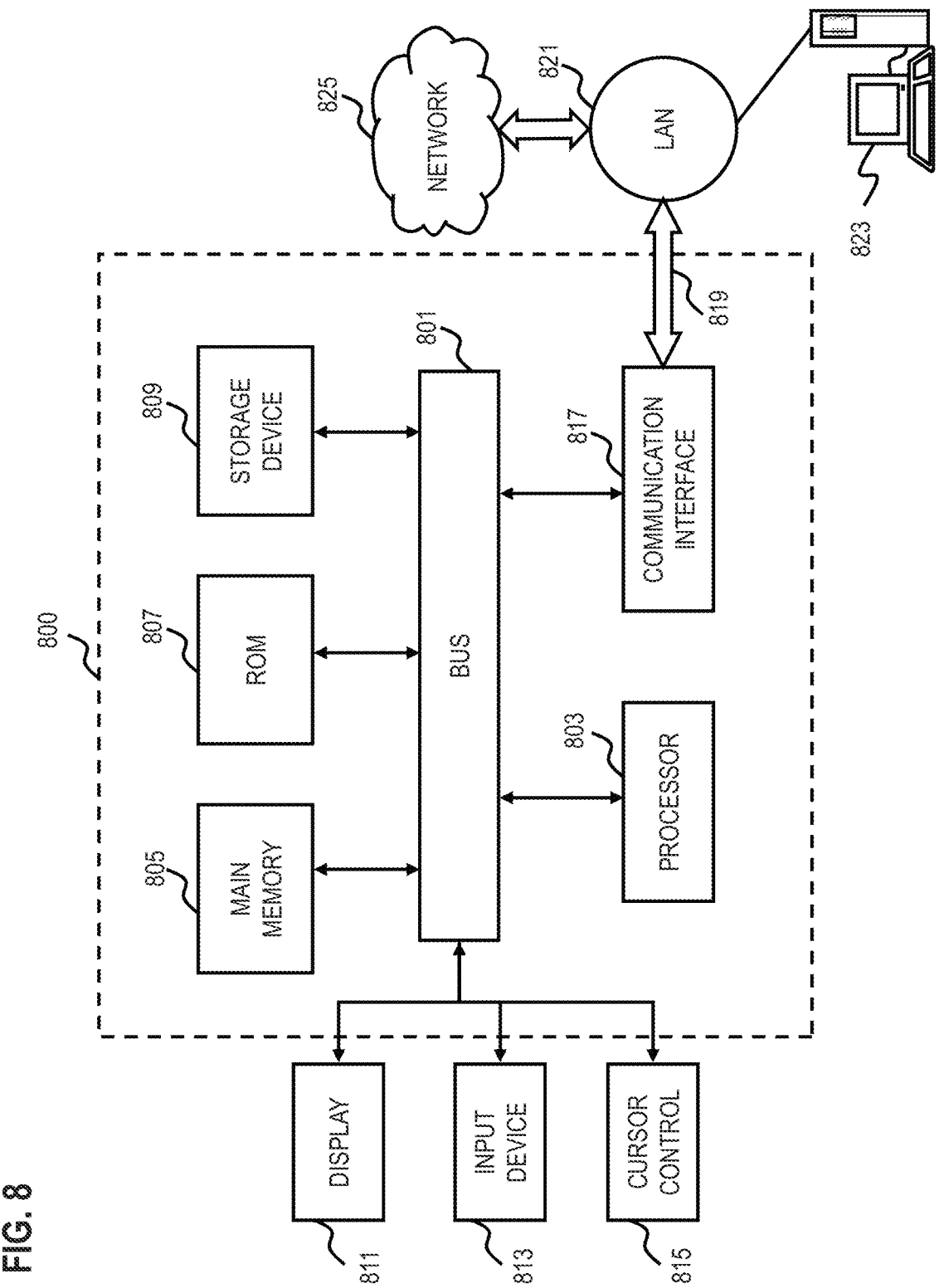
FIG. 8 is a diagram of a computer system that can be used to implement various embodiments.

FIG. 8 illustrates computing hardware (e.g., computer system) upon which an embodiment according to the disclosure can be implemented. The computer system 800 comprises a bus 801 or other communication mechanism for communicating information and a processor 803 coupled to the bus 801 for processing information. The computer system 800 also comprises main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further comprise a read only memory (ROM) 807 or other static storage device coupled to the bus 801 for storing static information and instructions for the processor 803. In one embodiment, a storage device 809, such as a magnetic disk or optical disk, is coupled to the bus 801 for persistently storing information and instructions.

In various embodiments, the computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, in one embodiment, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the disclosure, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the disclosure. Thus, embodiments of the disclosure are not limited to any specific combination of hardware circuitry and software.

The computer system 800 also includes a communication interface 817 coupled to bus 801. The communication interface 817 generally provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices.

For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
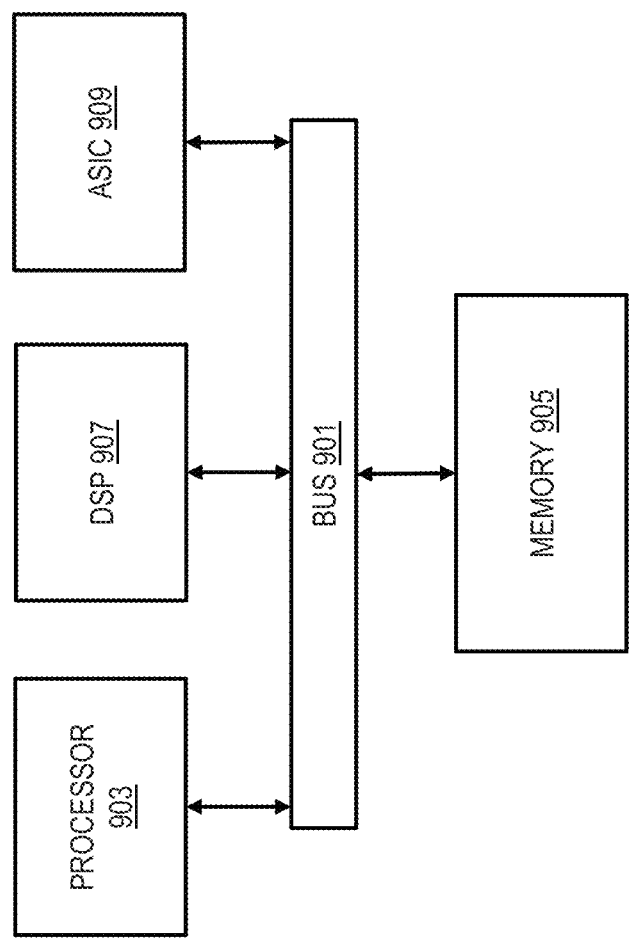
FIG. 9 is a diagram of a chip set that can be used to implement various exemplary embodiments.

FIG. 9 illustrates a chip set 900 upon which an embodiment of the invention may be implemented. The chip set 900 is programmed to present a slideshow as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. The chip set 900, or a portion thereof, constitutes a means for performing one or more steps of FIGS. 1B, 1D, 5, and 6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to presenting a slideshow via a set-top box. The memory 905 also stores the data associated with or generated by the execution of the inventive steps.

While the invention has been described in connection with a number of embodiments and implementations, the invention is not so limited but covers various obvious modifications and equivalent arrangements, which fall within the purview of the appended claims.

What is claimed is:

1. A computer implemented method, comprising the steps of:
   receiving, at a privileged access management (PAM) system, an electronic access request from an accessor device for access to a web endpoint, wherein the electronic access request comprises identifying information that uniquely identifies a user of the accessor device;
   querying, via the PAM system, a credential manager for one or more credential options corresponding to one or more access credentials, wherein the one or more credential options are selectable by the user of the accessor device, and wherein the credential manager is operable to manage credentials for one or more web endpoints and is managed and/or maintained in a separate physical system and/or virtual system from the PAM system; and transmitting, from the PAM system to a protocol agent, a selected particular credential option for accessing the web endpoint, wherein the particular credential option is transmitted over a communication link in an electronic communications network, and wherein the protocol agent is managed and/or maintained in a separate physical system and/or virtual system from the PAM system, whereby the protocol agent retrieves particular access credentials from the credential manager based on the selected particular credential option and provides the particular access credentials to the web endpoint to allow access to the web endpoint by the accessor device and, wherein the particular access credentials are not received by the PAM system.

2. The computer implemented method of claim 1, wherein prior to the step of querying the credential manager for the one or more credential options corresponding to the one or more access credentials, the method further comprises the step of establishing the communication link over the electronic communications network between the accessor device, the web endpoint, and the protocol agent.

3. The computer implemented method of claim 1, wherein prior to transmitting, from the PAM system to the protocol agent, the selected particular credential option for accessing the web endpoint, the method further comprises the steps of:
receiving, at the PAM system, the one or more credential options corresponding to the one or more access credentials, wherein the one or more credential options are dependent upon the identifying information that uniquely identifies the user;
transmitting, from the PAM system to the accessor device, the one or more credential options for selection by the user of the accessor device; and
receiving, at the PAM system, a selection of a particular credential option for accessing the web endpoint.

4. The computer implemented method of claim 1, further comprising the steps of:
receiving, at the PAM system, an electronic injection request from the protocol agent for injecting electronic information into the web endpoint, wherein the electronic injection request comprises injection information that uniquely identifies a field for injecting the electronic information into the web endpoint;
querying, via the PAM system, the credential manager for injection credentials associated with the injection information;
receiving the injection credentials from the credential manager; and
transmitting, from the PAM system to the protocol agent, the injection credentials for injecting the electronic information into a particular location in the web endpoint.

5. The computer implemented method of claim 4, wherein the electronic injection request is received in response to the accessor device accessing the field in the web endpoint.

6. The computer implemented method of claim 1, wherein the particular credential option is a non-privileged access credential.

7. The computer implemented method of claim 1, wherein the one or more credential options are presented to the accessor device as a name, nickname, other identifier, or a combination thereof.

8. The computer implemented method of claim 1, wherein the protocol agent provides the particular access credentials to the web endpoint by an injection mechanism.

9. The computer implemented method of claim 8, wherein the injection mechanism includes a programmatic method, a proxy-based credential injection into a protocol stream, an automatic keystroke entry, copying of the particular access credentials into corresponding log-in fields, or a combination thereof.

10. The computer implemented method of claim 1, wherein the particular access credentials are provided to the web endpoint using a secure data stream, an encryption mechanism, or a combination thereof.

11. The computer implemented method of claim 10, wherein the encryption mechanism includes using encryption keys valid for a duration of a single transfer of the particular access credentials.

12. The computer implemented method of claim 1, wherein the one or more credential options are selected from a list generated using the identifying information.

13. The computer implemented method of claim 1, wherein the particular access credentials are rotated by the protocol agent.

14. A system, comprising:
a web endpoint;
an accessor device for accessing the web endpoint;
a privileged access management (PAM) system;
a credential manager for managing credentials for one or more web endpoints, wherein the credential manager is managed and/or maintained in a separate physical system and/or virtual system from the PAM system; and
a protocol agent that is managed and/or maintained in a separate physical system and/or virtual system from the PAM system;
the PAM system comprising a processor operative to:
receive an electronic access request from the accessor device for access to the web endpoint, wherein the electronic access request comprises identifying information that uniquely identifies a user of the accessor device;
query the credential manager for one or more credential options corresponding to one or more access credentials for the web endpoint, wherein the one or more credential options are selectable by the user of the accessor device;
transmit, to the protocol agent, a selected particular credential option for accessing the web endpoint, wherein the particular credential option is transmitted over a communication link in an electronic communications network; and
whereby the protocol agent retrieves particular access credentials from the credential manager based on the selected particular credential option and provides the particular access credentials to the web endpoint to allow access to the web endpoint by the accessor device and, wherein the particular access credentials are not received by the PAM system.

15. The system of claim 14, wherein the processor is further operative to establish the communication link in the electronic communications network between the protocol agent, the accessor device, and the web endpoint.

16. The system of claim 14, wherein the processor is further operative to:
receive the one or more credential options corresponding to the one or more access credentials, wherein the one or more credential options are dependent upon the identifying information that uniquely identifies the user;
transmit, to the accessor device, the one or more credential options for selection by the user of the accessor device; and
receive a selection of a particular credential option for accessing the web endpoint.

17. The system of claim 14, wherein the PAM system is further operative to:
receive an electronic injection request from the protocol agent for injecting electronic information into the web endpoint, wherein the electronic injection request comprises injection information that uniquely identifies a field for injecting the electronic information into the web endpoint;
query the credential manager for injection credentials associated with the injection information;
receive the injection credentials from the credential manager; and
transmit the injection credentials for injecting the electronic information into a particular location in the web endpoint.

18. The system of claim 17, wherein the electronic injection request is received in response to the accessor device accessing the field in the web endpoint.

19. The system of claim 14, wherein the particular credential option is a non-privileged access credential.

20. The system of claim 14, wherein the one or more credential options are presented to the accessor device as a name, nickname, other identifier, or a combination thereof.

21. The system of claim 14, wherein the protocol agent provides the particular access credentials to the web endpoint by an injection mechanism.

22. The system of claim 21, wherein the injection mechanism includes a programmatic method, a proxy-based credential injection into a protocol stream, an automatic keystroke entry, copying of the particular access credentials into corresponding log-in fields, or a combination thereof.

23. The system of claim 14, wherein the particular access credentials are provided to the web endpoint using a secure data stream, an encryption mechanism, or a combination thereof.

24. The system of claim 23, wherein the encryption mechanism includes using encryption keys valid for a duration of a single transfer of the particular access credentials.

25. The system of claim 14, wherein the one or more credential options are selected from a list generated using the identifying information.

26. The system of claim 14, wherein the particular access credentials are rotated by the protocol agent.

27. A system, comprising:
at least one processor;
at least one non-transitory memory comprising computer program code; and
a privileged access management (PAM) system, wherein the at least one processor and the at least one non-transitory memory enable the PAM system to:
receive an electronic access request from an accessor device for access to a web endpoint, wherein the electronic access request comprises identifying information that uniquely identifies a user of the accessor device;
query a credential manager for one or more credential options corresponding to one or more access credentials, wherein the one or more credential options are selectable by the user of the accessor device, and wherein the credential manager is operable to manage credentials for one or more web endpoints and is managed and/or maintained in a separate physical system and/or virtual system from the PAM system; and
transmit, to a protocol agent, a selected particular credential option for accessing the web endpoint, wherein the particular credential option is transmitted over a communication link in an electronic communications network, and wherein the protocol agent is managed and/or maintained in a separate physical and/or virtual system from the PAM system,
whereby the protocol agent retrieves particular access credentials from the credential manager based on the selected particular credential option and provides the particular access credentials to the web endpoint to allow access to the web endpoint by the accessor device, and wherein the particular access credentials are not received by the PAM system.

28. The system of claim 27, wherein the PAM system is further operative to:
receive an electronic injection request from the protocol agent for injecting electronic information into the web endpoint, wherein the electronic injection request comprises injection information that uniquely identifies a field for injecting the electronic information into the web endpoint;
query the credential manager for injection credentials associated with the injection information;
receive the injection credentials from the credential manager; and
transmit the injection credentials for injecting the electronic information into a particular location in the web endpoint.

* * * * *